US012701637B2

(12) United States Patent
Xin et al.

(10) Patent No.: US 12,701,637 B2
(45) Date of Patent: Aug. 4, 2026

(54) COMMUNICATION METHOD AND COMMUNICATION APPARATUS

(71) Applicant: HUAWEI TECHNOLOGIES CO., LTD., Shenzhen (CN)

(72) Inventors: Tingyu Xin, Shenzhen (CN); Bingzhao Li, Beijing (CN); Yan Wang, Beijing (CN); Zhenzhen Cao, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 18/496,231

(22) Filed: Oct. 27, 2023

(65) Prior Publication Data

US 2024/0064864 A1     Feb. 22, 2024

Related U.S. Application Data

(63) Continuation of application No. PCT/CN2022/083109, filed on Mar. 25, 2022.

(30) Foreign Application Priority Data

Apr. 30, 2021     (CN) ......................... 202110484672.4

(51) Int. Cl.
*H04W 76/40*          (2018.01)
*H04W 76/12*          (2018.01)

(52) U.S. Cl.
CPC ........... *H04W 76/40* (2018.02); *H04W 76/12* (2018.02)

(58) Field of Classification Search
CPC .............................. H04W 4/06; H04L 12/1886
See application file for complete search history.

(56) References Cited

U.S. PATENT DOCUMENTS

2022/0225057 A1* 7/2022 Godin .................... H04W 48/16
2022/0322159 A1* 10/2022 Xu .................... H04W 36/0235
(Continued)

FOREIGN PATENT DOCUMENTS

CN          101267593 A       9/2008
CN          102137430 A       7/2011
(Continued)

OTHER PUBLICATIONS

3GPP TR 23.757 V2.0.0 (Mar. 2021), 3rd Generation Partnership Project; Technical Specification Group Services and System Aspects; Study on architectural enhancements for 5G multicast-broadcast services (Release 17), total 297 pages.

*Primary Examiner* — Fabricio R Murillo Garcia
(74) *Attorney, Agent, or Firm* — Rimon PC

(57)          ABSTRACT

Embodiments of this application provide for a communication method and a related communication apparatus. A second access network device receives a first message from a first access network device, where the first message indicates whether a first state of a multicast broadcast service (MBS) session is activated or deactivated. The second access network device sends a first acknowledgment message corresponding to the first message to the first access network device. In this solution, the first message indicates the first state of the MBS session, and the second access network device may determine, based on the first state, whether to request a core network to establish a user plane (UP) tunnel. If the first state of the MBS session is activated, the second access network device may be triggered to newly establish a UP tunnel, to ensure a normal transmission of the MBS in a handover process.

20 Claims, 10 Drawing Sheets

(56)                References Cited

U.S. PATENT DOCUMENTS

| | | | | |
|---|---|---|---|---|
| 2023/0262734 A1* | 8/2023 | Qi | ......................... | H04L 12/189 |
| | | | | 455/414.1 |
| 2024/0073649 A1* | 2/2024 | Godin | ................... | H04L 65/611 |
| 2024/0172328 A1* | 5/2024 | Ling | .................... | H04W 76/40 |
| 2024/0196244 A1* | 6/2024 | Jiang | .................... | H04W 76/40 |

FOREIGN PATENT DOCUMENTS

| | | | |
|---|---|---|---|
| CN | 111866975 | A | 10/2020 |
| EP | 3065429 | A1 | 9/2016 |
| EP | 4156727 | A1 | 3/2023 |
| WO | 2021234635 | A1 | 11/2021 |
| WO | 2022000512 | A | 1/2022 |

* cited by examiner

First cell:
MBS cell, providing an MBS service
...

Handover

Second cell:
MBS cell, having no MBS service
...

First cell:
MBS cell, providing an MBS service
...

Handover

Second cell:
non-MBS cell
...

First access network device

Second access network device

S401: First message

S402: First acknowledgment message

1200

1201

Storage unit

1202

Processing unit

1203

Communication unit

COMMUNICATION METHOD AND COMMUNICATION APPARATUS

CROSS-REFERENCE TO RELATED APPLICATIONS

This application is a continuation of International Application No. PCT/CN2022/083109, filed on Mar. 25, 2022, which claims priority to Chinese Patent Application No. 202110484672.4, filed on Apr. 30, 2021. The disclosures of the aforementioned applications are hereby incorporated by reference in their entireties.

TECHNICAL FIELD

This application generally relates to the communication field, and in particular, to a communication method and a communication apparatus.

BACKGROUND

A multicast broadcast service (MBS) is a service in which an access network device perform a transmission with a plurality of terminal devices. Common MBSs include a live broadcast service, a public security service, a batch software update service, and the like. MBS data is received from a data server, is then sent by a core network device to the access network device, and then is sent by the access network device to at least one terminal device.

When a terminal device is in transit (e.g., moving its location), a signal strength of each cell connected to the terminal device may change. The terminal device may then need to switch from a first cell to a second cell to prevent communication quality deterioration caused by deterioration of a signal quality of the cell. The first cell is served by a source access network device, and the second cell is served by a target access network device. The source access network device supports a MBS manner and provides the MBS to the terminal device. However, when the target access network device does not have a particular MBS required by the terminal device, or when the target access network device does not support the MBS manner, how to maintain MBS data transmission in a handover process is a problem that needs to be urgently resolved.

SUMMARY

Embodiments of this application provide for a communication method and a related apparatus, to ensure normal transmission of a multicast broadcast service (MBS) in a handover process, and avoid unnecessary waste of resources.

According to a first aspect, a communication method is provided. The method may be performed by a second access network device or a chip in the second access network device. The method includes receiving a first message from a first access network device, where the first message indicates whether a first state of an MBS session is activated or deactivated. The method further includes sending a first acknowledgment message corresponding to the first message to the first access network device. In this solution, the first message indicates the first state of the MBS session, and the second access network device may determine, based on the first state, whether to request a core network to establish a user plane (UP) tunnel. If the first state of the MBS session is activated, the second access network device may trigger to newly establish a UP tunnel, to ensure normal transmission of the MBS in a handover process. If the first state of the MBS session is deactivated, the second access network device may not trigger to newly establish a UP tunnel or may request to newly establish and suspend a UP tunnel, to avoid wasting resources.

With reference to the first aspect, when the first message indicates that the first state of the MBS session is activated, the method further includes sending a first request message to a core network device, where the first request message requests to establish a UP tunnel corresponding to the MBS session. When the first message indicates that the first state of the multicast broadcast service MBS session is deactivated, the method further includes determining that a UP tunnel corresponding to the MBS session does not need to be established currently. When the first message indicates that the first state of the MBS session is deactivated, the method further includes sending a first request message to a core network device, where the first request message requests to establish a UP tunnel corresponding to the MBS session, and the UP tunnel is suspended.

Optionally, the first message is a handover request message, and the first acknowledgment message is a handover request acknowledgment message.

Optionally, the first message includes first state information, and the first state information indicates whether the first state is activated or deactivated. Alternatively, the first message indicates whether the first state is activated or deactivated based on whether first state information is or is not included within the first message.

According to a second aspect, a communication method is provided. The method may be performed by a first access network device or a chip in the first access network device. The method includes sending a first message to a second access network device, where the first message indicates whether a first state of an MBS session is activated or deactivated. The method further includes receiving a first acknowledgment message corresponding to the first message from the second access network device. This solution can ensure a normal transmission of the MBS in a handover process, and avoid a wasting resources.

Optionally, the first message is a handover request message, and the first acknowledgment message is a handover request acknowledgment message.

With reference to the second aspect, before the sending of the first message to the second access network device, the method further includes receiving third information sent by a core network device, where the third information indicates the first state of the MBS session.

Optionally, the third information is information included in an MBS session modification message. The third information is information included in a packet data unit (PDU) session modification message, where the PDU session is associated with the MBS session. Alternatively, the third information is information in an information field in a packet header of a data packet of the MBS service.

According to a third aspect, a communication method is provided. The method may be performed by a second access network device or a chip in the second access network device. The method includes sending a second message to a core network device. The method further includes receiving a second acknowledgment message corresponding to the second message from the core network device, where the second message indicates whether a first state of an MBS session is activated or deactivated. Alternatively or additionally, the second acknowledgment message indicates whether a second state of the MBS session is activated or deactivated. A state of the MBS session is the first state or the second state, where the first state is a state of the MBS session before a terminal device is handed over, the second state is a state of the MBS session after the terminal device is handed over, and the MBS is an MBS that the terminal device is interested in or is receiving. The second access network device may learn of the state of the MBS session based on the second message or the second acknowledgment message. If the state of the MBS session is activated, the second access network device may be triggered to newly establish a UP tunnel, to ensure a normal transmission of the MBS in a handover process. Alternatively, if the state of the MBS session is deactivated, the second access network device may not be triggered to newly establish a UP tunnel or may request to newly establish and suspend a UP tunnel, to avoid wasting resources. In addition, in the handover process, the state of the MBS session may change. This solution can avoid a problem of behavior mismatch caused by the change of the state of the MBS session.

With reference to the third aspect, when the state of the MBS session is activated, the method further includes sending a first request message to a core network device, where the first request message requests to establish a UP tunnel corresponding to the MBS session. When the state of the MBS session is deactivated, the method further includes determining that a UP tunnel corresponding to the MBS session does not need to be established currently. Alternatively, when the state of the MBS session is deactivated, the method further includes sending a first request message to a core network device, where the first request message requests to establish a UP tunnel corresponding to the MBS session, and the UP tunnel is suspended.

With reference to the third aspect, after receiving the second acknowledgment message from the core network device, the method further includes determining that the state of the MBS session is the second state. Optionally, when the first state is activated, the second state is deactivated, and it is determined that the state of the MBS session is deactivated.

Optionally, the second message is a path switch request message, and the second acknowledgment message is a path switch request acknowledgment message.

Optionally, the second message includes first state information, and the first state information indicates whether the first state is activated or deactivated. Alternatively, the second message indicates the first state based on whether first state information is or is not included within the second message.

Optionally, the second acknowledgment message includes second state information, and the second state information indicates whether the second state is activated or deactivated. Alternatively, the second acknowledgment message indicates the second state based on whether second state information is or is not included.

According to a fourth aspect, a communication method is provided. The method may be performed by a core network device or a chip in the core network device. The method includes receiving a second message from a second access network device. The method further includes sending a second acknowledgment message corresponding to the second message to the second access network device, where the second message indicates whether a first state of an MBS session is activated or deactivated. Alternatively or additionally, the second acknowledgment message indicates whether a second state of the MBS session is activated or deactivated. This solution can ensure a normal transmission of the MBS in a handover process, and avoids wasting resources. In addition, this solution can further avoid a problem of a behavior mismatch caused by a change of a state of the MBS session in the handover process.

With reference to the fourth aspect, when the state of the MBS session is activated, the method further includes receiving a first request message from the second access network device, where the first request message requests to establish a UP tunnel corresponding to the MBS session. When the state of the MBS session is deactivated, the method further includes determining that a UP tunnel corresponding to the MBS session does not need to be established currently. Alternatively, when the state of the MBS session is deactivated, the method further includes receiving a first request message from the second access network device, where the first request message requests to establish a UP tunnel corresponding to the MBS session, and the user plane tunnel is suspended.

According to a fifth aspect, a communication method is provided. The method may be performed by a second access network device or a chip in the second access network device. The method includes sending a fourth message to a core network device, where the fourth message requests to establish a UP tunnel corresponding to an MBS session. The method further includes receiving a fourth acknowledgment message corresponding to the fourth message from the core network device, where the fourth acknowledgment message indicates whether a state of the MBS session is activated or deactivated. In this solution, the second access network device may learn, based on the fourth acknowledgment message, management performed by the core network device on the UP tunnel. If the first state of the MBS session is activated, the second access network device may be triggered to newly establish a UP tunnel, to ensure a normal transmission of the MBS in a handover process. Alternatively, if the first state of the MBS session is deactivated, the second access network device may not be triggered to newly establish a UP tunnel or suspend a newly established UP tunnel, to avoid wasting resources.

Optionally, the fourth acknowledgment message includes information for establishing the UP tunnel and indicates that the state of the MBS session is activated. The fourth acknowledgment message includes information for rejecting establishment of the UP tunnel. Alternatively, the fourth acknowledgment message includes information for establishing the UP tunnel and indicates that the state of the MBS session is deactivated.

According to a sixth aspect, a communication method is provided. The method may be performed by a core network device or a chip in the core network device. The method includes receiving a fourth message from a second access network device, where the fourth message requests to establish a UP tunnel corresponding to an MBS session. The method further includes sending a fourth acknowledgment message corresponding to the fourth message to the second access network device, where the fourth acknowledgment message indicates whether a second state of the MBS session is activated or deactivated. In this solution, the second access network device may learn, based on the fourth acknowledgment message, management performed by the core network device on the UP tunnel, to ensure a normal transmission of the MBS in a handover process and avoid resource waste.

According to a seventh aspect, a communication method is provided. The method may be performed by a core network device or a chip in the core network device. The method includes determining a first state of an MBS session. The method further includes sending third information to a first access network device, where the third information indicates the first state of the MBS session. This solution may be applied before handover, so that the first access network device learns of a state of the MBS session, to determine an operation of MBS transmission, and ensure normal MBS transmission after subsequent handover.

Optionally, the third information is information included in an MBS session modification message. The third information is information included in a first PDU session modification message or establishment message, where the first PDU session is associated with the MBS session. Alternatively, the third information is information in an information field in a packet header of a data packet of the MBS service.

According to an eighth aspect, a communication method is provided. The method may be performed by a first access network device or a chip in the first access network device. The method includes receiving third information, where the third information indicates a first state of an MBS session. The method further includes storing MBS state information in an MBS context and/or a context of a terminal device. This solution may be applied before a cell handover, so that the first access network device learns of a state of the MBS session based on the third information, to determine an operation of MBS transmission, and ensure a normal MBS transmission after the subsequent cell handover.

According to a ninth aspect, a communication method is provided. The method may be performed by a first access network device or a chip in the first access network device. The method includes determining that a state of an MBS session is deactivated, where the MBS session is associated with a first PDU session. The method further includes sending a fifth message to a core network device, where the fifth message requests to release the first PDU session, and the first PDU session is used only for the MBS session. Alternatively, the method further includes sending a fifth message to a core network device, where the fifth message requests to delete information about the MBS session from the first PDU session, the first PDU session is used for transmitting a unicast service, and/or the first PDU session is further associated with another activated MBS session. This solution can avoid wasting resources caused by deletion of a newly established UP tunnel that is not yet used.

In an implementation, when the fifth message requests to release the first PDU session, the method further includes releasing a radio resource control (RRC) connection of a terminal device.

In another implementation, when the fifth message requests to delete information about the MBS session from the first PDU session, the method further includes sending handover indication information to a terminal device, where the handover indication information indicates the terminal device to switch to a target cell, and the target cell does not support the MBS session. The first access network device is a source access network device serving the terminal device.

According to a tenth aspect, a communication method is provided. The method may be performed by a core network device or a chip in the core network device. The method includes receiving a fifth message from a first access network device, where the fifth message requests to release a first PDU session, and the first PDU session is only used for an MBS session or the method includes receiving a fifth message from a first access network device, where the fifth message requests to delete information about an MBS session from a first PDU session, the first PDU session is used for transmitting a unicast service, and/or the first PDU session is further associated with another activated MBS session. A state of the MBS session is deactivated, and the MBS session is associated with the first PDU session.

According to an eleventh aspect, a communication system is provided. The communication system may include a first access network device and a second access network device. The second access network device may be configured to perform the method in any possible implementation of the first aspect, and the first access network device may be configured to perform the method in any possible implementation of the second aspect.

According to a twelfth aspect, a communication system is provided. The communication system may include a second access network device and a core network device. The second access network device may be configured to perform the method in any possible implementation of the third aspect, and the core network device may be configured to perform the method in any possible implementation of the fourth aspect; or the second access network device may be configured to perform the method in any possible implementation of the fifth aspect, and the core network device may be configured to perform the method in any possible implementation of the sixth aspect.

According to a thirteenth aspect, a communication system is provided. The communication system may include a first access network device and a core network device. The first access network device may be configured to perform the method in any possible implementation of the eighth aspect, and the core network device may be configured to perform the method in any possible implementation of the seventh aspect; or the first access network device may be configured to perform the method in any possible implementation of the ninth aspect, and the core network device may be configured to perform the method in any possible implementation of the tenth aspect.

According to a fourteenth aspect, a communication system is provided. The communication system may include a first access network device, a second access network device, and a core network device. The second access network device may be configured to perform the method in any possible implementation of the first aspect, the third aspect, and/or the fifth aspect, the first access network device may be configured to perform the method in any possible implementation of the second aspect and/or the eighth aspect, and the core network device may be configured to perform the method in any possible implementation of the fourth aspect, the sixth aspect, and/or the seventh aspect.

According to a fifteenth aspect, a communication apparatus is provided, including modules or units (e.g., circuits) configured to perform the method in any possible implementation of the first aspect, the third aspect, or the fifth aspect.

According to a sixteenth aspect, a communication apparatus is provided, including modules or units configured to perform the method in any possible implementation of the second aspect, the eighth aspect, or the ninth aspect.

According to a seventeenth aspect, a communication apparatus is provided, including modules or units configured to perform the method in any possible implementation of the fourth aspect, the sixth aspect, the seventh aspect, or the tenth aspect.

According to an eighteenth aspect, a communication apparatus is provided, including a processor. The processor is communicatively coupled (e.g., hardwired or wirelessly) to a memory, and may be configured to execute instructions in the memory, so that the communication apparatus performs the method in any possible implementation of the first aspect, the third aspect, or the fifth aspect. Optionally, the communication apparatus further includes the memory. Optionally, the communication apparatus further includes a transceiver and/or an antenna. Optionally, the communication apparatus may be a second access network device or a chip configured in the second access network device.

According to a nineteenth aspect, a communication apparatus is provided, including a processor. The processor is communicatively coupled to a memory, and may be configured to execute instructions in the memory, so that the communication apparatus performs the method in any possible implementation of the second aspect, the eighth aspect, or the ninth aspect. Optionally, the communication apparatus further includes the memory. Optionally, the communication apparatus further includes a transceiver and/or an antenna. Optionally, the communication apparatus may be a first access network device or a chip configured in the first access network device.

According to a twentieth aspect, a communication apparatus is provided, including a processor. The processor is communicatively coupled to a memory, and may be configured to execute instructions in the memory, so that the communication apparatus performs the method in any possible implementation of the fourth aspect, the sixth aspect, the seventh aspect, or the tenth aspect. Optionally, the communication apparatus further includes the memory. Optionally, the communication apparatus may be a core network device or a chip configured in the core network device.

According to a twenty-first aspect, an access network device is provided. The access network device may implement the method in any possible implementation of the first aspect, the third aspect, or the fifth aspect, or the access network device may implement the method in any possible implementation of the second aspect, the eighth aspect, or the ninth aspect. Optionally, the access network device may be a chip (such as a baseband chip or a communication chip) or a base station device. The foregoing method may be implemented by using software or hardware, or by hardware executing corresponding software.

In a possible implementation, the access network device includes a processor and a memory. The processor is configured to support the access network device in performing the method in any possible implementation of the first aspect, the third aspect, or the fifth aspect; or the processor is configured to support the access network device in performing the method in any possible implementation of the second aspect, the eighth aspect, or the ninth aspect. The memory is configured to store instructions and/or data. Optionally, the access network device further includes a radio frequency unit and an antenna.

In another possible implementation, the access network device includes a baseband unit (e.g., baseband circuit) and a transceiver unit (e.g., transceiver circuit). The baseband unit is configured to perform an action implemented within the access network device in any possible implementation of the first aspect, the third aspect, or the fifth aspect, or the baseband unit is configured to perform an action implemented within the access network device in any possible implementation of the second aspect, the eighth aspect, or the ninth aspect. The transceiver unit is configured to perform an action of sending to the outside or receiving from the outside performed by the access network device.

In still another possible implementation, the access network device includes a processor and a transceiver. The processor is configured to support the access network device in performing the method in any possible implementation of the first aspect, the third aspect, or the fifth aspect; or the processor is configured to support the access network device in performing the method in any possible implementation of the second aspect, the eighth aspect, or the ninth aspect. When the access network device is a chip, the transceiver may be an input/output unit, for example, an input/output circuit or an input/output interface.

In still another possible implementation, the access network device may include a unit module for performing a corresponding action in any possible implementation of the first aspect, the third aspect, or the fifth aspect, or the access network device may include a unit module for performing a corresponding action in any possible implementation of the second aspect, the eighth aspect, or the ninth aspect.

According to a twenty-second aspect, a core network device is provided. The core network device may implement the method in any possible implementation of the fourth aspect, the sixth aspect, the seventh aspect, or the tenth aspect. Optionally, the core network device may be a chip (such as a baseband chip or a communication chip) or a core network device. The foregoing method may be implemented by using software or hardware, or by hardware executing corresponding software.

In a possible implementation, the core network device includes a processor and a memory. The processor is configured to support the core network device in performing the method in any possible implementation of the fourth aspect, the sixth aspect, the seventh aspect, or the tenth aspect. The memory is configured to store instructions and/or data.

In another possible implementation, the core network device includes a processor and an interface circuit. The processor is configured to communicate with another apparatus through the interface circuit, and perform the method in any possible implementation of the fourth aspect, the sixth aspect, the seventh aspect, or the tenth aspect.

In still another possible design, the core network device includes a processing unit, and the processing unit may be configured to perform some internal operations of the core network device. Functions performed by the processing unit may correspond to operations in the fourth aspect, the sixth aspect, the seventh aspect, or the tenth aspect.

In still another possible implementation, the core network device may include a unit module for performing a corresponding action in any possible implementation of the fourth aspect, the sixth aspect, the seventh aspect, or the tenth aspect.

According to a twenty-third aspect, a computer-readable storage medium is provided, storing a computer program or instructions. When the computer program or the instructions are executed, the method in any possible implementation of the first aspect, the third aspect, or the fifth aspect is implemented.

According to a twenty-fourth aspect, a computer-readable storage medium is provided, storing a computer program or instructions. When the computer program or the instructions are executed, the method in any possible implementation of the second aspect, the eighth aspect, or the ninth aspect is implemented.

According to a twenty-fifth aspect, a computer-readable storage medium is provided, storing a computer program or instructions. When the computer program or the instructions are executed, the method in any possible implementation of the fourth aspect, the sixth aspect, the seventh aspect, or the tenth aspect is implemented.

According to a twenty-sixth aspect, a processor is provided, including an input circuit, an output circuit, and a processing circuit. The processing circuit is configured to receive a signal through the input circuit, and transmit a signal through the output circuit, so that the processor performs the method in any one of the foregoing aspects or the possible implementations of the foregoing aspects. Optionally, the processor is a chip, the input circuit is an input pin, the output circuit is an output pin, and the processing circuit is a transistor, a gate circuit, a trigger, various logic circuits, and/or the like.

According to a twenty-seventh aspect, a computer program product including a computer program or instructions is provided. When the computer program or the instructions are run, a computer is enabled to perform the method in any possible implementation of the first aspect, the third aspect, or the fifth aspect.

According to a twenty-eighth aspect, a computer program product including a computer program or instructions is provided. When the computer program or the instructions are run, a computer is enabled to perform the method in any possible implementation of the second aspect, the eighth aspect, or the ninth aspect.

According to a twenty-ninth aspect, a computer program product including a computer program or instructions is provided. When the computer program or the instructions are run, a computer is enabled to perform the method in any possible implementation of the fourth aspect, the sixth aspect, the seventh aspect, or the tenth aspect.

DESCRIPTION OF EMBODIMENTS

Figure 1:
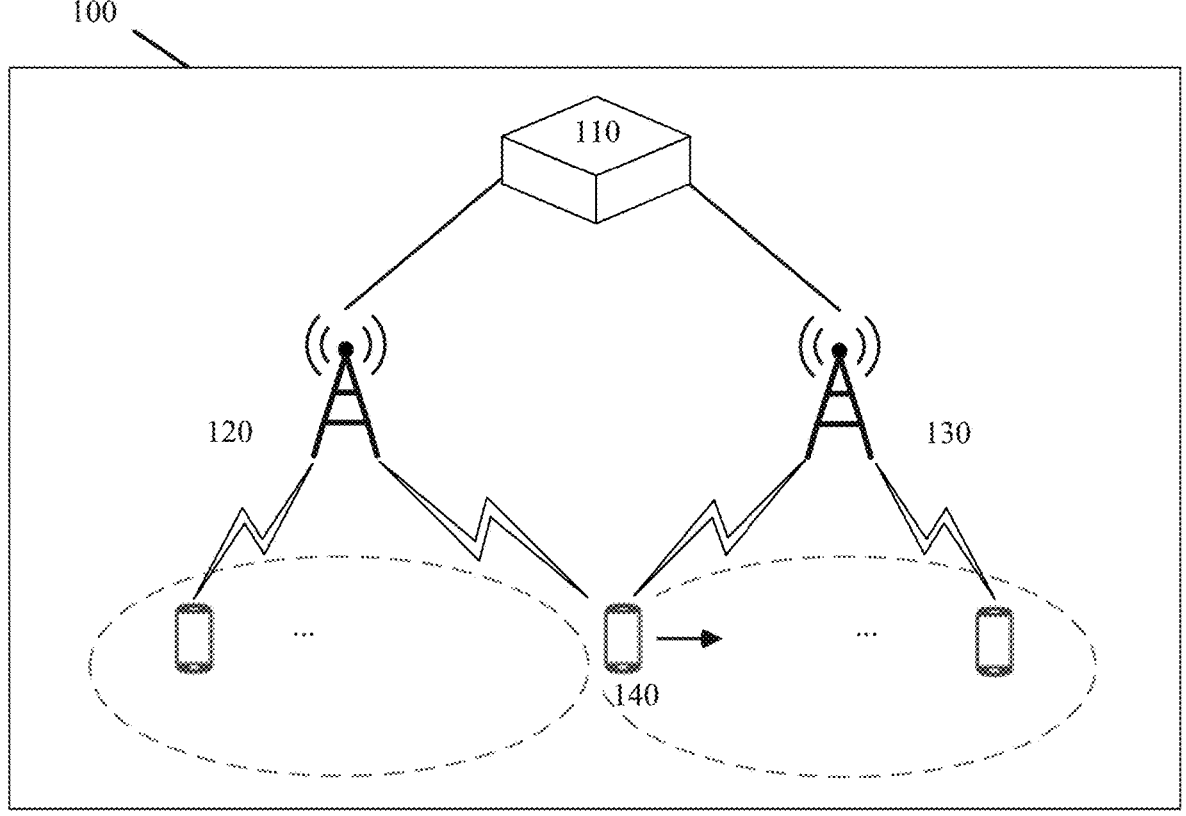
FIG. 1 is a schematic diagram of a communication system according to embodiments of this application.

The following embodiments describe technical solutions of this application with reference to the accompanying drawings.

The method and the apparatus provided in embodiments of this application may be applied to various communication systems, for example, a long term evolution (LTE) system, a 5th generation (5G) system, a new radio (NR) system, a wireless fidelity (Wi-Fi) system, a communication system related to the 3rd generation partnership project (3GPP), another communication system that may appear in the future, or a plurality of communication convergence systems. A core network of a 4th generation (4G) system may be referred to as an evolved packet core (EPC) network, and an access network may be referred to as LTE. A core network of a 5G system may be referred to as a 5G core (5GC), and an access network may be referred to as new radio (NR). For ease of description, this application is described by using the 5G system as an example. However, it may be understood that this application is also applicable to the 4G system and the like. A communication system in this application includes an access network device, a core network device, and a terminal device, which are separately describes in the following.

The access network device is a network-side device having a wireless transceiver function. The access network device may be an apparatus that provides a wireless communication function for the terminal device in a radio access network (RAN), and therefore, may also be referred to as a RAN device. For example, the access network device may be a base station, an evolved NodeB (eNodeB), a next-generation NodeB (gNB) in a 5G mobile communication system, a transmission reception point (TRP), a future evolved base station in 3GPP, an access node in a Wi-Fi system, a wireless relay node, a wireless backhaul node, or the like. In communication systems using different radio access technologies (RATs), names of devices having a base station function may be different. For example, the device may be referred to as an eNB or an eNodeB in an LTE system, and may be referred to as a gNB in a 5G system or an NR system. A specific name of the base station is not limited in this application. The access network device may include one or more co-sited or non-co-sited transmission and reception points. For another example, the access network device may include one or more central units (CUs), one or more distributed units (DUs), or one or more CUs and one or more DUs. For example, a function of the CU may be implemented by one entity or different entities. For example, the function of the CU may be further divided, to be specific, a control plane and a user plane are split, and are implemented by using different entities: a control plane CU entity (namely, a CU-CP entity) and a user plane CU entity (namely, a CU-UP entity). The CU-CP entity and the CU-UP entity may be coupled to the DU, to jointly complete the function of the access network device. In this way, some functions of the radio access network device may be implemented by using a plurality of network function entities. These network function entities may be network elements in a hardware device, may be software functions running on dedicated hardware, or may be virtualization functions instantiated on a platform (for example, a cloud platform). For another example, in a vehicle to everything (V2X) technology, the access network device may be a road side unit (RSU). A plurality of access network devices in the communication system may be base stations of a same type, or may be base stations of different types. The base station may communicate with a terminal device, or may communicate with a terminal device through a relay station. In embodiments of this application, an apparatus for implementing the function of the access network device may be the access network device, or may be an apparatus that can support the access network device in implementing the function, for example, a chip system, or a combined device or component that can implement the function of the access network device. The apparatus may be installed in the access network device. In embodiments of this application, the chip system may include a chip, or may include a chip and another discrete component. In embodiments of this application, the access network device is used as an example to describe the technical solution.

The core network device is configured to implement functions such as mobility management, data processing, session management, and policy and charging. Names of devices that implement core network functions in systems of different access technologies may be different. This is not limited in this application. A 5G system is used as an example. Logical network elements of a 5GC include an access and mobility management function (AMF), a session management function (SMF), a user plane function (UPF), and the like. The AMF is a network element configured to perform access and mobility management on a terminal device, and relates to functions such as location update, network registration, and handover control of the terminal device. The SMF is a network element configured to manage a session of the terminal device, and relates to functions such as session establishment, modification, and release. The UPF is a network element configured to receive and forward user data. The UPF is controlled by the SMF. Different logical network elements of the 5GC may be deployed on a same device or different physical devices. For example, the AMF and the SMF may be deployed on a same physical device, or may be deployed on two physical devices. In addition, the logical network element of the 5GC and a network element of a 4G core network may be deployed on a same physical device. An apparatus for implementing a function of the core network device may be the core network device, or may be an apparatus that can support the core network device in implementing the function, for example, a chip system, or a combined device or component that can implement the function of the core network device. The apparatus may be installed in the core network device. In embodiments of this application, the core network device is used as an example to describe the technical solution.

The terminal device is a user-side device having a wireless transceiver function, and may be a fixed device, a mobile device, a handheld device (for example, a mobile phone), a wearable device, a vehicle-mounted device, or a wireless apparatus (for example, a communication module, a modem, or a chip system) built in the foregoing device. The terminal device is configured to connect people, things, machines, and the like, and may be widely used in various scenarios, for example, cellular communication, device-to-device (D2D) communication, V2X communication, machine-to-machine/machine type communication (M2M/MTC) communication, internet of things (IoT), virtual reality (VR), augmented reality (AR), industrial control, self-driving, telemedicine, smart grid, smart furniture, smart office, smart wearable, intelligent transportation, smart city, unmanned aerial vehicle, and robot. For example, the terminal device may be a handheld terminal in cellular communication, a communication device in D2D, an IoT device in MTC, a surveillance camera in intelligent transportation and a smart city, or a communication device in an unmanned aerial vehicle. The terminal device may be sometimes referred to as user equipment (UE), a user terminal, a user apparatus, a user unit, a user station, a terminal, an access terminal, an access station, a UE station, a remote station, a mobile device, a wireless communication device, or the like.

In embodiments of this application, an apparatus for implementing the function of the terminal device may be the terminal device, or may be an apparatus that can support the terminal device in implementing the function, for example, a chip system, or a combined device or component that can implement the function of the terminal device. The apparatus may be installed in the terminal device. In embodiments of this application, the terminal device is used as an example to describe the technical solution.

FIG. 1 is a schematic diagram of a communication system applicable to this application. The communication system 100 includes a core network device 110, a first access network device 120, a second access network device 130, and a terminal device 140.

The core network device 110 receives an MBS from a server, and sends the MBS to an access network device (the first access network device 120 or the second access network device 130).

The first access network device 120 may be referred to as a source access network device, for example, a source gNB. Correspondingly, the first cell served by the first access network device 120 may be referred to as a source cell. Before the terminal device 140 performs a cell handover, the first access network device 120 provides a network service for the terminal device 140. For example, before the cell handover, the first access network device 120 is configured to receive an MBS from the core network device 110, and send the MBS to the terminal device 140.

The second access network device 130 may be referred to as a target access network device, for example, a target gNB. Correspondingly, the second cell is served by the second access network device 130, and may be referred to as a target cell. After the terminal device 140 performs the cell handover, the second access network device provides a network service for the terminal device 140. For example, after the cell handover, the second access network device 130 is configured to receive an MBS from the core network device 110, and send the MBS to the terminal device 140.

The terminal device 140 is configured to communicate with an access network device, and receive data from the access network device, or send data to the access network device. For example, the terminal device 140 is configured to receive an MBS from the access network device. When a terminal device is in transit (e.g., changing its location), signal strength of each cell may change. The terminal device may then need to switch from the first cell to the second cell to prevent communication quality deterioration caused by a deterioration of a signal quality of the cell. As shown in FIG. 1, the terminal device is moving away from the first cell that is currently accessed. When strength of a signal sent by the first access network device to the terminal device decreases to a specific (e.g., predetermined) value, if the terminal device continues to camp on the first cell and continues to be served by the first access network device, communication quality will deteriorate and a service cannot be normally transmitted, or even cause the service to become disconnected. To ensure a normal communication of the terminal device, if the terminal device determines that signal strength of the second cell is greater than the signal strength of the first cell, the terminal device needs to report the event to the first access network device, to trigger the first access network device to initiate a handover procedure so that it may hand over the terminal device from the first cell to the second cell.

For ease of understanding, some technical terms in this application are first explained. For ease of description, an example in which the terminal device is UE is used for description in this application subsequently.

1. Multicast broadcast service (MBS): An MBS is a service in which transmission is performed between a plurality of UEs, for example, a live broadcast service, a public security service, and a batch software update service. The MBS may alternatively be referred to as a multimedia broadcast multicast service (MBMS). Description information of the MBS includes description information of one or more MBS flows. The description information of the MBS flow includes at least one of the following: a quality of service identifier (QFI) of the MBS flow, characteristic information of the MBS flow, or a quality of service (QoS) requirement of the MBS flow. A data packet of the MBS flow may be identified by using a QoS flow identifier sequence number (QFI SN) or a user plane general packet radio service (GPRS) tunneling protocol user plane (GTP-U) sequence number (GTP-U SN).

2. Unicast: At a core network layer, unicast may be understood to mean a transmission of service data to UE through a protocol data unit (PDU) session. A unicast manner of the MBS means that MBS data is sent to the UE through a PDU session, or in other words, the MBS data is sent to the UE through a UE-level user plane tunnel. This manner may be referred to as a 5GC individual multicast broadcast service traffic transmission manner, and may be referred to as a unicast manner for short subsequently. A unicast service is a service oriented to single UE. The unicast transmission manner (PTP) means that a transmission manner of data packets on the air interface side is oriented to single UE.

3. Multicast/broadcast: At the core network layer, multicast/broadcast means that MBS data is sent to a terminal device through a multicast/broadcast session, or in other words, the MBS data is sent to UE through a shared user plane (UP) tunnel. This manner may alternatively be referred to as a 5GC shared multicast broadcast service traffic transmission manner, and may be referred to as a multicast broadcast manner for short subsequently.

4. Protocol data unit session (PDU session): A PDU session provides data connectivity between UE and a data network (DN). Therefore, before sending data traffic, the UE needs to first establish the PDU session. The UE initiates a creation, and a core network accepts a request of the UE and allocates corresponding control plane and user plane resources, so that the UE can perform data transmission with the DN. The PDU session is at a UE level. To be specific, a PDU session is used for only one UE. When the PDU session is established, a PDU session tunnel is established. The UE requests the core network to create a PDU session, and the core network may create one or more PDU sessions based on a service requirement of the UE.

5. Multicast broadcast session (MBS session): An MBS session is used for MBS service transmission. An MBS may be transmitted between a core network device and an access network device through a public transmission channel, namely, the MBS session. Each MBS session includes at least one MBS quality of service (QoS) flow. In contrast to the PDU session, the MBS session is oriented to a plurality of UEs. For UE that performs MBS service transmission through the MBS session, there is also a PDU session associated with the MBS session. The PDU session includes a QoS flow and an MBS ID of the MBS service. In other words, the QoS flow and the MBS ID of the MBS service exist in a UE context. The PDU session associated with the MBS session may be any one of the following: the PDU session includes the QoS flow of the MBS; the PDU session includes QoS flows of a plurality of MBSs, and one of the QoS flows is the QoS flow of the MBS; or the PDU session includes a QoS flow of a unicast service and the QoS flow of the MBS. A state of the MBS session may be activated (e.g., activation) or deactivated (e.g., deactivation), and is triggered and managed by the core network. MBS information (the QoS flow and the MBS ID) included in the PDU session may still be stored in the UE context regardless of whether the MBS session is in an activated state or a deactivated state. This avoids a situation where the MBS information needs to be added or deleted in a plurality of modifications when the state of the MBS session changes between activated and deactivated.

6. User plane tunnel (UP tunnel): A user plane tunnel is a GPRS tunneling protocol user plane (GTP-U) tunnel, and is used for data transmission between a UPF network element and an access network device in a core network. In the activated state, the MBS may be transmitted through a UP tunnel corresponding to the MBS session. In the deactivated state, the UP tunnel corresponding to the MBS session is deleted, and when the MBS session is activated again, the tunnel corresponding to the MBS session may be re-established.

Figure 2:
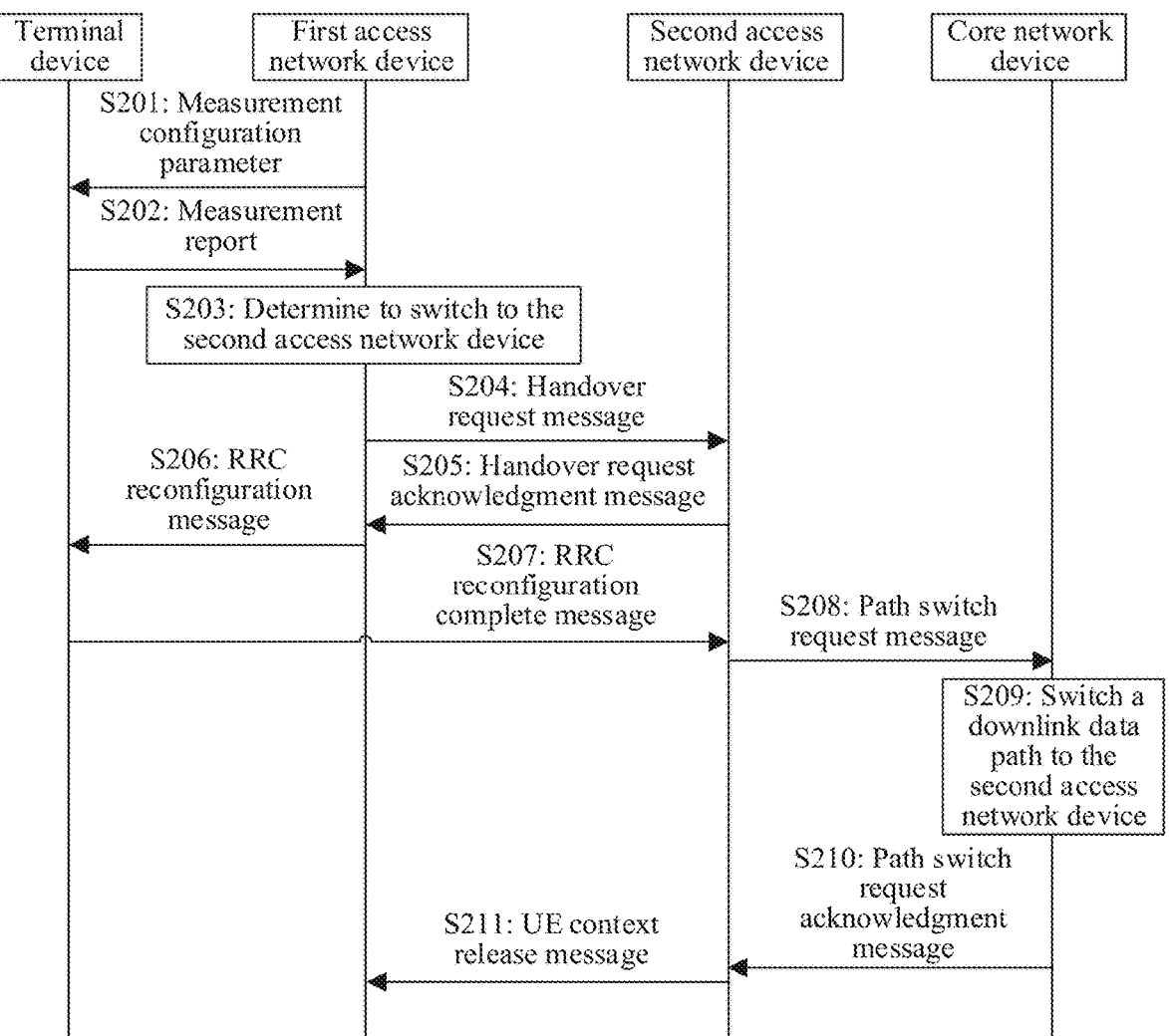
FIG. 2 is a schematic diagram of a handover procedure according to embodiments of this application.

FIG. 2 is a schematic diagram of a handover (HO) procedure. The following briefly describes the handover procedure with reference to FIG. 2.

Before S201, UE accesses a first access network device. For example, the UE camps on a first cell, and enters a radio resource control (RRC) connected state. A core network device sends service data of the UE to the first access network device. For example, the service is an MBS. Correspondingly, the first access network device receives the service data, and sends the service data to the UE.

S201. The first access network device sends a measurement configuration parameter to the UE. Correspondingly, the UE receives the measurement configuration parameter from the first access network device.

The measurement configuration parameter includes at least one of the following: measurement frequency/cell information, reporting threshold configuration, filtering parameter configuration, timer duration configuration, or the like.

S202: The UE in the RRC connected state sends a measurement report. Correspondingly, the first access network device receives the measurement report.

For example, the UE measures signal strength of a frequency or a cell based on the measurement configuration parameter, and determines a measurement result. Then, the UE determines and reports the measurement report based on the measurement result.

S203: The first access network device determines a second access network device based on the measurement report, an operation strategy, a PLMN supported by the UE, or the like. The second access network device is an access network device, for example, a target base station, to which the UE is to switch. The first access network device is an access network device, for example, a source base station, currently serving the UE.

S204: The first access network device sends a handover request message to the second access network device, and sends UE context information to the second access network device along with the handover request message. Correspondingly, the second access network device receives the handover request message from the first access network device.

S205: The second access network device sends a handover request acknowledgment message to the first access network device. Correspondingly, the first access network device receives the handover request acknowledgment message from the second access network device.

For example, the second access network device determines that the UE is allowed to access, and sends the handover request acknowledgment message to the first access network device. Optionally, the handover request acknowledgment message includes at least one of the following: a cell radio network temporary identifier (C-RNTI) and a security algorithm of the second access network device.

S206: The first access network device sends an RRC reconfiguration message to the UE. Correspondingly, the UE receives the RRC reconfiguration message from the first access network device.

Optionally, the RRC reconfiguration message includes at least one of the following: a physical cell identifier (PCI) of a second cell, a new C-RNTI, a security algorithm identifier of the second access network device, random access channel (RACH) resource information (for example, a dedicated RACH resource and/or a common RACH resource) required for accessing the second cell, and a system information block (SIB) of the second cell.

S207: The UE synchronizes to the second cell, and sends an RRC reconfiguration complete message to the second access network device, to indicate that RRC handover is completed, that is, RAN handover is completed.

S208: The second access network device sends a path switch request message to the core network device. Correspondingly, the core network device receives the path switch request message sent by the second access network device.

The path switch request message is for triggering switching of a downlink data path to the second access network device, and establishing a control plane interface between the core network device and the second access network device.

S209: The core network device switches the downlink data path to the second access network device.

S210: The core network device sends a path switch request acknowledgment message to the second access network device. Correspondingly, the second access network device receives the path switch request acknowledgment message sent by the core network device.

Optionally, the core network device in S208 and S210 is an access and mobility management function (AMF).

In conclusion, an objective of the path switch request is to request the core network to switch a termination point of a user plane transmission bearer (e.g., termination points of some user plane transmission bearers) of the UE on the first access network device to the second access network device, so that the core network can continue to transmit data to the UE by using the second access network device.

S211: The second access network device sends a UE context release message to the first access network device. Correspondingly, the first access network device receives the UE context release message sent by the second access network device.

The release message indicates that the handover succeeds. Further, the first access network device releases a radio resource and a control plane resource that are associated with the UE context.

Figure 3A:
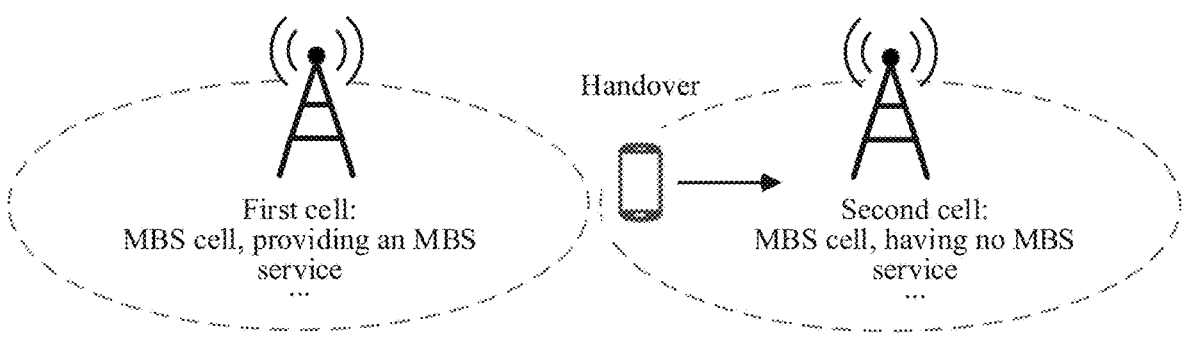
FIG. 3A is a schematic diagram of a handover scenario according to embodiments of this application.
Figure 3B:
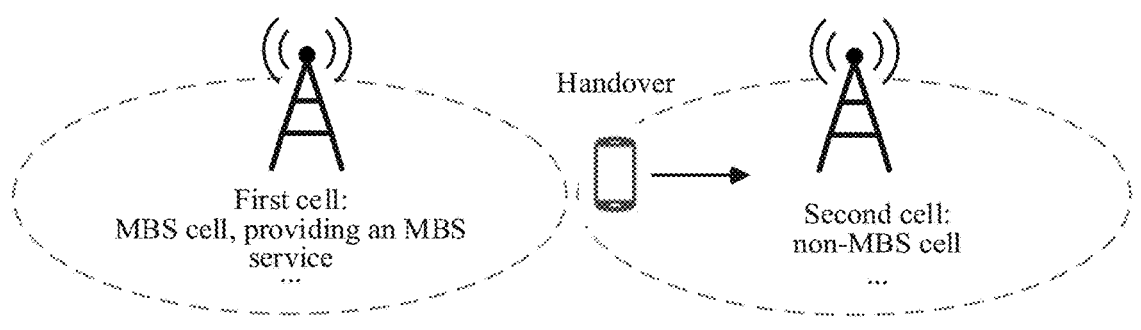
FIG. 3B is a schematic diagram of another handover scenario according to embodiments of this application.

Some embodiments relate to two handover scenarios. A scenario 1 is shown in FIG. 3A, and a scenario 2 is shown in FIG. 3B. In some embodiments, an access network device supporting an MBS session may be referred to as an MBS access network device, a cell served by the MBS access network device may be referred to as an MBS cell, and MBS transmission is performed between the core network device and the MBS access network device through the MBS session. In some embodiments, an access network device that does not support an MBS session may be referred to as a non-MBS access network device, for example, a legacy base station, a cell served by the non-MBS access network device may be referred to as a non-MBS cell, and MBS transmission is performed between the core network device and the non-MBS access network device through a unicast PDU session.

(1) Scenario 1:

The first access network device is an MBS access network device. Before the UE is handed over to the second cell, the first access network device has an MBS that the UE is transmitting or is interested in. The second access network device is an MBS access network device. However, before the UE is handed over to the second cell, the second access network device does not have an MBS that the UE is transmitting or is interested in. The second cell is a serving cell of the second access network device.

In the scenario 1, the second access network device does not have the MBS required by the UE before the handover, and does not know a state of an MBS session. Therefore, after discovering a PDU session having MBS information, the second access network device triggers the core network device to establish an UP tunnel for the MBS, to transmit MBS data. However, if the current state of the MBS session is deactivated, that is, no MBS data needs to be transmitted, the newly established UP tunnel is deleted after a period of time. The new UP tunnel is deleted before being used. This wastes resources as the newly established UP tunnel is not utilized.

(2) Scenario 2

The first access network device is an MBS access network device. The second access network device is a non-MBS access network device.

In the scenario 2, the second access network device cannot identify an MBS session and a state of the MBS session. Therefore, the second access network device triggers the core network device to establish an UP tunnel for a PDU session associated with the MBS session, to transmit MBS data. However, if the current state of the MBS session is deactivated, and the PDU session associated with the MBS session only includes a QoS flow of the MBS, after a period of time, the newly established UP tunnel is deleted because there is no MBS data. In other words, the newly established UP tunnel is deleted before being used. This wastes resources as the newly established UP tunnel is not utilized. If the current state of the MBS session is deactivated, and the PDU session associated with the MBS session includes the QoS flow of the MBS and a QoS flow of another service, a redundant message, for example, QoS flow information associated with the MBS session, is introduced in the process of establishing the UP tunnel. This wastes signaling resources as the newly established UP tunnel is not utilized.

To resolve the foregoing technical problem, the following describes a method provided in embodiments of this application with reference to the accompanying drawings. It may be understood that the following method embodiments are described by using examples in which execution bodies are a core network device, an access network device, and a terminal device. The core network device mentioned in the method embodiments may be alternatively performed by a chip configured in the core network device, the access network device mentioned in the method embodiments may be alternatively performed by a chip configured in the access network device, and the terminal device may be alternatively performed by a chip configured in the terminal device. The core network device, the access network device, and the terminal device may be various forms mentioned above. For example, the access network device may be a device having an RRC connection control function, such as a base station, a CU, or a CU-CP. For example, the core network device may be a device having an AMF function, or a device having an AMF function and a UPF function, the core network device may be a device having an AMF function and an SMF function, or the core network device may be a device having an AMF function, a UPF function, and an SMF function.

Figure 4:
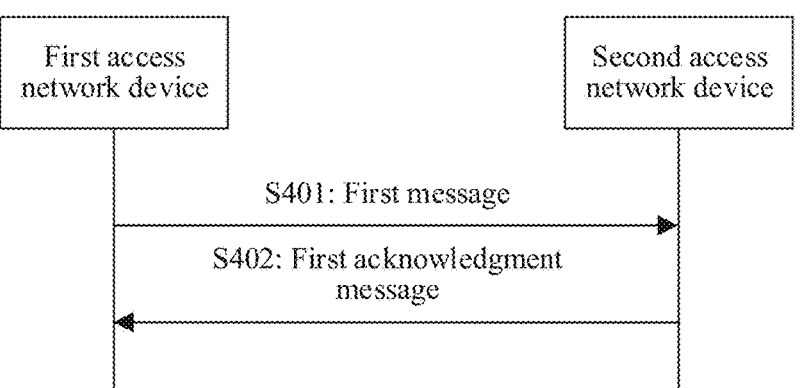
FIG. 4 is a flowchart of a communication method according to embodiments of this application.

FIG. 4 is a schematic flowchart of a communication method according to Embodiment 1 of this application. As shown in FIG. 4, a communication system provided in Embodiment 1 includes a first access network device and a second access network device. The first access network device may be configured to perform the method in any possible implementation of Embodiment 1, and the second access network device may be configured to perform the method in any possible implementation of Embodiment 1. In Embodiment 1, a possible implementation is described by using the scenario 1 shown in FIG. 3A as an example. The method includes the following steps.

S401: The first access network device sends a first message. Correspondingly, the second access network device receives the first message. The first message indicates whether a first state of an MBS session is activated or deactivated.

S402: The second access network device sends a first acknowledgment message. Correspondingly, the first access network device receives the first acknowledgment message. The first acknowledgment message is an acknowledgment message corresponding to the first message.

The MBS is a service that the UE is interested in or is receiving. The first state is a state of the MBS session before the UE is handed over. In other words, the core network device notifies the first access network device of the state of the MBS session before the UE is handed over.

Optionally, an MBS context managed by the first access network device includes the first state of the MBS session. After learning of the MBS state from the core network device, the first access network device may store MBS state information for subsequent use. The information is stored in the foregoing MBS context and/or a UE context.

Optionally, the second access network device stores the state of the MBS session in the MBS context and/or the UE context.

That the first message indicates the first state of the MBS session is described in the following method 1, method 2, or method 3.

Method 1: The first message includes first state information, and the first state information indicates whether the first state is activated or deactivated.

Method 2: The first message indicates the first state based on whether first state information is or is not included. For example, when the first message includes the first state information, the first message indicates that the first state is activated. Alternatively, when the first message does not include the first state information, the first message indicates that the first state is deactivated. Optionally, the first state information is activation information of the MBS session.

Method 3: The first message indicates the first state based on whether first state information is or is not included. For example, when the first message includes the first state information, the first message indicates that the first state is deactivated. Alternatively, when the first message does not include the first state information, the first message indicates that the first state is activated. Optionally, the first state information is deactivation information of the MBS session.

Optionally, the first message is a handover request message, and the first acknowledgment message is a handover request acknowledgment message. To indicate the first state of the MBS session, a new information element (IE) needs to be added to the existing handover request message.

Optionally, the first message is a new message, and the first acknowledgment message is also a new message. For example, the first message is newly introduced to indicate the first state of the MBS session.

In a possible implementation, after step S401, the method further includes that the second access network device obtains, based on the first message, that the state of the MBS session is the first state.

When the state of the MBS session is activated, the second access network device sends a first request message to a core network device, where the first request message requests to establish a UP tunnel corresponding to the MBS session. Correspondingly, the core network device receives the first request message sent by the second access network device.

When the state of the MBS session is deactivated, a processing manner of the second access network device is one of the following two processing manners: In a first processing manner, the second access network device determines that a UP tunnel corresponding to the MBS session does not need to be established currently. In other words, the second access network device determines that the second access network device does not need to request a core network device to establish the UP tunnel corresponding to the MBS session. In this case, when the MBS session is activated, establishment of the UP tunnel is requested. Correspondingly, the core network device determines that the UP tunnel corresponding to the MBS session does not need to be established currently. In other words, the core network device does not need to receive a message that is sent by the second access network device and that requests to establish the UP tunnel. In a second processing manner, the second access network device sends a first request message to a core network device, where the first request message requests to establish a UP tunnel corresponding to the MBS session, and the UP tunnel is suspended. It may be understood that, before the MBS session is activated, the UP tunnel is suspended, or in other words, the tunnel is in a deactivated state. To be specific, the UP tunnel is reserved and is not used for MBS data transmission. When the MBS session is subsequently activated, the UP tunnel may continue to be used, to avoid a UP tunnel deletion procedure. Correspondingly, the core network device receives a message that is sent by the second access network device and that requests to establish the UP tunnel.

The first message indicates the first state of the MBS session, and the second access network device may determine, based on the first state, whether to request the core network to establish the UP tunnel. If the first state of the MBS session is activated, the second access network device may trigger to newly establish a UP tunnel, to ensure normal transmission of the MBS in a handover process. Alternatively, if the first state of the MBS session is deactivated, the second access network device may not trigger to newly establish a UP tunnel or may request to newly establish and suspend a UP tunnel, to avoid a resource waste problem.

Figure 5:
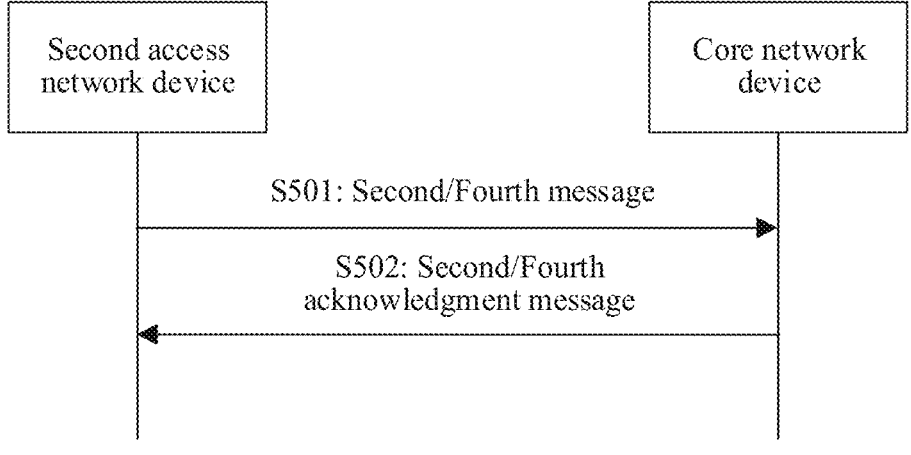
FIG. 5 is a flowchart of another communication method according to embodiments of this application.

FIG. 5 is a schematic flowchart of a communication method according to Embodiment 2 of this application. As shown in FIG. 5, a communication system provided in Embodiment 2 includes a second access network device and a core network device. The second access network device may be configured to perform the method in any possible implementation of this embodiment, and the core network device may be configured to perform the method in any possible implementation of this embodiment. In Embodiment 2, a possible implementation is described by using the scenario 1 shown in FIG. 3A as an example. The method includes the following steps.

S501: The second access network device sends a second message. Correspondingly, the core network device receives the second message.

S502: The core network device sends a second acknowledgment message. Correspondingly, the second access network device receives the second acknowledgment message. The second acknowledgment message is an acknowledgment message corresponding to the second message.

The second message indicates that a first state of an MBS session is activated or deactivated, where for descriptions of the first state, refer to Embodiment 1, and details are not described herein again. Alternatively or additionally, the second acknowledgment message indicates that a second state of the MBS session is activated or deactivated, where the second state is a state of the MBS session after UE is handed over, that is, a state that is of the MBS session and of which the core network device notifies the second access network device through the second acknowledgment message after the UE is handed over.

That the second message indicates the first state of the MBS session is described in the following method 1, method 2, or method 3.

Method 1: The second message includes first state information, and the first state information indicates whether the first state is activated or deactivated.

Method 2: The second message indicates the first state based on whether first state information is or is not included. For example, when the second message includes the first state information, the second message indicates that the first state is activated. Alternatively, when the second message does not include the first state information, the second message indicates that the first state is deactivated. Optionally, the first state information is activation information of the MBS session.

Method 3: The second message indicates the first state based on whether first state information is or is not included. For example, when the second message includes the first state information, the second message indicates that the first state is deactivated. Alternatively, when the second message does not include the first state information, the second message indicates that the first state is activated. Optionally, the first state information is deactivation information of the MBS session.

That the second acknowledgment message indicates the second state of the MBS session is described in the following method 1, method 2, or method 3.

Method 1: The second acknowledgment message includes second state information, and the second state information indicates whether the second state is activated or deactivated.

Method 2: The second acknowledgment message indicates the second state based on whether second state information is or is not included. For example, when the second acknowledgment message includes the second state information, the second acknowledgment message indicates that the second state is activated. Alternatively, when the second acknowledgment message does not include the second state information, the second acknowledgment message indicates that the second state is deactivated. Optionally, the second state information is activation information of the MBS session.

Method 3: The second acknowledgment message indicates the second state based on whether second state information is or is not included. For example, when the second acknowledgment message includes the second state information, the second acknowledgment message indicates that the second state is deactivated. Alternatively, when the second acknowledgment message does not include the second state information, the second acknowledgment message indicates that the second state is activated. Optionally, the second state information is deactivation information of the MBS session.

In a possible implementation, the second acknowledgment message indicates whether the second state of the MBS session is activated or deactivated. Optionally, after S502, the second access network device obtains that the state of the MBS session is the second state.

In another possible implementation, the second message indicates whether the first state of the MBS session is activated or deactivated. Optionally, before S501, the second access network device obtains that the state of the MBS session is the first state. After receiving the second message, if the core network finds that the current state of the MBS session is the first state, the second acknowledgment message may not carry information indicating the second state, or the second acknowledgment message may confirm that the current status of the MBS session is the first state.

In still another possible implementation, the second message indicates whether the first state of the MBS session is activated or deactivated, and the second acknowledgment message indicates whether the second state of the MBS session is activated or deactivated. Optionally, after S502, the second access network device determines that the state of the MBS session is the second state. For example, when the first state is activated, the second state is deactivated, the second access network device determines that the state of the MBS session is deactivated.

Optionally, the second message is a path switch request message, and the second acknowledgment message is a path switch request acknowledgment message. To indicate the first state of the MBS session, a new information element needs to be added to the existing path switch request message. Alternatively or additionally, to indicate the second state of the MBS session, a new information element needs to be added to the existing path switch request acknowledgment message.

Optionally, the second message is a new message, and the second acknowledgment message is also a new message. For example, the second message is newly introduced to indicate the first state of the MBS session. Alternatively or additionally, the second acknowledgment message is newly introduced to indicate the second state of the MBS session.

When the state of the MBS session is activated, the second access network device sends a first request message to a core network device, where the first request message requests to establish a UP tunnel corresponding to the MBS session. Correspondingly, the core network device receives the first request message sent by the second access network device.

For a processing manner of the second access network device when the status of the MBS session is deactivated, refer to the descriptions in Embodiment 1. Details are not described herein again.

The second access network device may learn of the state of the MBS session based on the second message or the second acknowledgment message. If the state of the MBS session is activated, the second access network device may be triggered to newly establish a UP tunnel, to ensure normal transmission of the MBS in a handover process. Alternatively, if the state of the MBS session is deactivated, the second access network device may not be triggered to newly establish a UP tunnel or may request to newly establish and suspend a UP tunnel, to avoid wasting resources.

In the handover process, the state of the MBS session may change. In other words, the first state may be different from the second state. If processing is still performed based on the first state, a problem of behavior mismatch may be caused by the change of the state of the MBS session. For example, when the state of the MBS session changes from activated to deactivated, if the first access network device still performs processing based on the activated state, resources are wasted. For example, when the state of the MBS session changes from deactivated to activated, if the first access network device still performs processing based on the deactivated state, the UP tunnel cannot be established, and MBS data cannot be received normally. Therefore, the method in this embodiment can avoid the problem of behavior mismatch caused by the change of the state of the MBS session.

FIG. 5 is a schematic flowchart of a communication method according to Embodiment 3 of this application. As shown in FIG. 5, a communication system provided in Embodiment 3 includes a second access network device and a core network device. The second access network device may be configured to perform the method in any possible implementation of this embodiment, and the core network device may be configured to perform the method in any possible implementation of this embodiment. In Embodiment 3, a possible implementation is described by using the scenario 1 shown in FIG. 3A as an example. The method includes the following steps.

S501: The second access network device sends a fourth message. Correspondingly, the core network device receives the fourth message. The fourth message requests to establish a user plane tunnel corresponding to the MBS session. In other words, the user plane tunnel is used for data transmission of the MBS session.

S502: The core network device sends a fourth acknowledgment message. Correspondingly, the second access network device receives the fourth acknowledgment message. The fourth acknowledgment message is an acknowledgment message corresponding to the fourth message. The fourth acknowledgment message indicates whether a second state of an MBS session is activated or deactivated.

The second state is a state of the MBS session after UE is handed over, that is, a second state that is of the MBS session and of which the core network device notifies the second access network device through the fourth acknowledgment message after the UE is handed over.

Optionally, the fourth acknowledgment message includes information for establishing the user plane tunnel and indicates that the second state of the MBS session is activated.

Optionally, the fourth acknowledgment message includes information for rejecting establishment of the user plane tunnel. In this case, the state of the MBS session may be deactivated, to avoid a waste of resources caused by releasing a newly established tunnel.

Optionally, the fourth acknowledgment message includes information for establishing the user plane tunnel and indicates that the state of the MBS session is deactivated. In this case, the UP tunnel is suspended, or in other words, is in a deactivated state. To be specific, the UP tunnel is reserved, but is not used for MBS data transmission. An advantage of reserving the UP tunnel is that, when the MBS session is subsequently activated again, the UP tunnel may continue to be used, to avoid procedures related to UP tunnel deletion and reestablishment, so that signaling overheads are reduced, and a delay caused by UP tunnel reestablishment is avoided.

In the scenario 1, the second access network device may learn, based on the fourth acknowledgment message, management performed by the core network device on the UP tunnel. If the first state of the MBS session is deactivated, the second access network device may not be triggered to newly establish a UP tunnel or suspend a newly established UP tunnel, to avoid a resource waste. If the first state of the MBS session is activated, the second access network device may be triggered to newly establish a UP tunnel, to ensure normal transmission of the MBS in a handover process.

Figure 6:
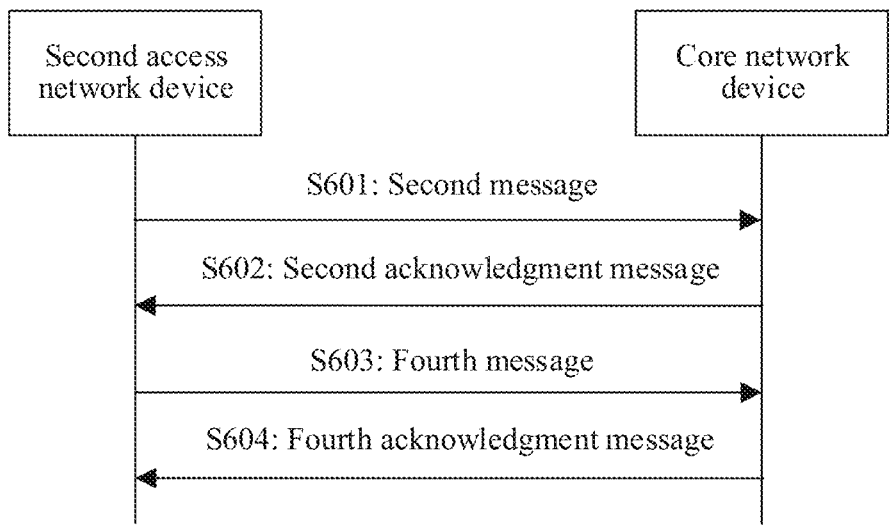
FIG. 6 is a flowchart of another communication method according to embodiments of this application.

Based on the solutions in Embodiment 2 and Embodiment 3, FIG. 6 is a schematic flowchart of a detailed communication method according to Embodiment 4 of this application. As shown in FIG. 6, a communication system provided in Embodiment 4 includes a second access network device and a core network device. The second access network device may be configured to perform the method in any possible implementation of this embodiment, and the core network device may be configured to perform the method in any possible implementation of this embodiment. In Embodiment 4, a possible implementation is described by using the scenario 1 shown in FIG. 3A as an example. It should be noted that, for Embodiment 4, refer to the descriptions of Embodiment 2 and Embodiment 3, and same parts are not described again. The method includes the following steps.

S601: The second access network device sends a second message. Correspondingly, the core network device receives the second message.

S602: The core network device sends a second acknowledgment message. Correspondingly, the second access network device receives the second acknowledgment message. The second acknowledgment message is an acknowledgment message corresponding to the second message.

The second message indicates a first state of an MBS session. Alternatively or additionally, the second acknowledgment message indicates a second state of the MBS session. Optionally, the second message is a path switch request message, and the second acknowledgment message is a path switch request acknowledgment message.

For descriptions of S601 and S602, refer to Embodiment 2. Details are not described herein again.

S603: The second access network device sends a fourth message. Correspondingly, the core network device receives the fourth message. The fourth message requests to establish a user plane tunnel corresponding to the MBS session.

S604: The core network device sends a fourth acknowledgment message. Correspondingly, the second access network device receives the fourth acknowledgment message. The fourth acknowledgment message is an acknowledgment message corresponding to the fourth message. The fourth acknowledgment message indicates whether a second state of an MBS session is activated or deactivated.

For descriptions of S603 and S604, refer to Embodiment 3. Details are not described herein again.

For example, when the second message indicates that the first state of the MBS session is activated, the fourth message requests to establish a UP tunnel associated with the MBS session, and the fourth acknowledgment message includes information for establishing the UP tunnel and indicates that the second state of the MBS session is activated.

For example, when the second message indicates that the first state of the MBS session is activated, the fourth message requests to establish a UP tunnel associated with the MBS session, and the fourth acknowledgment message includes information for rejecting establishment of the user plane tunnel, or the fourth acknowledgment message includes information for establishing the UP tunnel and indicates that the state of the MBS session is deactivated, where the UP tunnel is suspended.

For example, when the second acknowledgment message indicates that the second state of the MBS session is activated, the fourth message requests to establish a UP tunnel associated with the MBS session, and the fourth acknowledgment message includes information for establishing the UP tunnel and indicates that the second state of the MBS session is activated.

For example, when the second message indicates that the first state of the MBS session is deactivated, and the second acknowledgment message indicates that the second state of the MBS session is activated, the fourth message requests to establish a UP tunnel associated with the MBS session, and the fourth acknowledgment message includes information for establishing the UP tunnel and indicates that the second state of the MBS session is activated.

In a handover process, the state of the MBS session may change. The second access network device and the core network device exchange the state of the MBS session for a plurality of times, and determine whether to establish the UP tunnel, so that a problem of behavior mismatch caused by the change of the state of the MBS session is avoided. If the state of the MBS session is activated, the UP tunnel may be newly established between the second access network device and the core network device, to ensure normal transmission of the MBS in the handover process.

Figure 7:
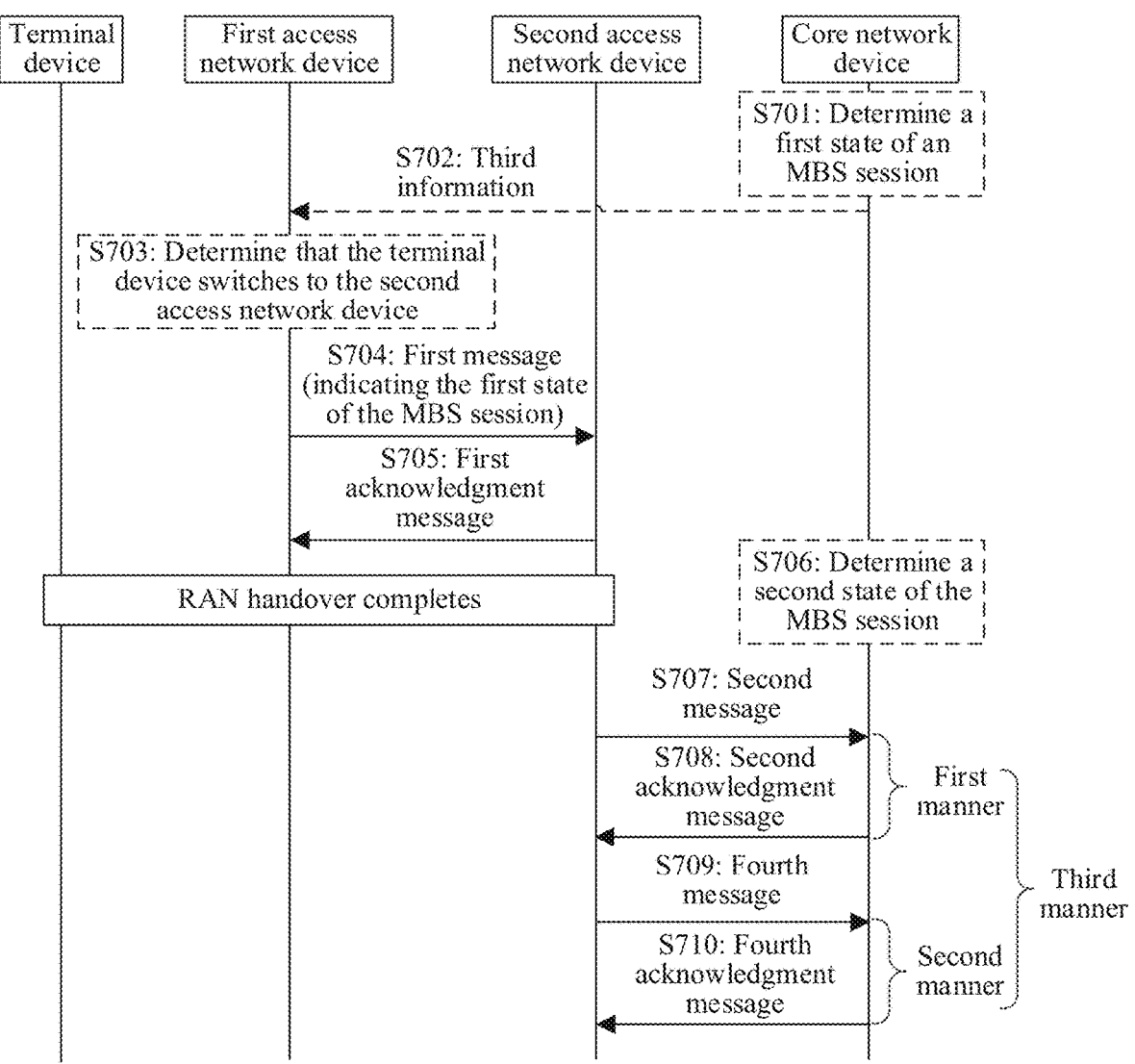
FIG. 7 is a flowchart of another communication method according to embodiments of this application.

Based on the solutions in Embodiment 1, Embodiment 2, Embodiment 3, and/or Embodiment 4, FIG. 7 is a schematic flowchart of a detailed communication method according to Embodiment 5 of this application. As shown in FIG. 7, a communication system provided in Embodiment 5 includes a first access network device, a second access network device, and a core network device. The first access network device may be configured to perform the method in any possible implementation of this embodiment, the second access network device may be configured to perform the method in any possible implementation of this embodiment, and the core network device may be configured to perform the method in any possible implementation of this embodiment. Steps represented by dashed lines in FIG. 7 are optional, and details are not described in the following. In Embodiment 5, a possible implementation is described by using the scenario 1 shown in FIG. 3A as an example. It should be noted that, for Embodiment 5, refer to the descriptions of Embodiment 1, Embodiment 2, Embodiment 3, and Embodiment 4, and same parts are not described again. The method includes the following steps.

S701: The core network device determines a first state of an MBS session.

A state of the MBS session is managed by the core network, that is, a change of the state of the MBS session is triggered by the core network. For descriptions of the first state, refer to Embodiment 1. Details are not described herein again.

S702: The core network device sends third information. Correspondingly, the first access network device receives the third information. The third information indicates the first state of the MBS session.

Optionally, the third information is information included in an MBS session modification message. Alternatively, the third information is information in an information field in a packet header of a data packet of the MBS service.

Optionally, the third information is information included in a first PDU session modification message or establishment message, where the first PDU session is associated with the MBS session. UE notifies the first access network device of a service that the UE is interested in, or applies for joining the MBS session (e.g., MBS session join), so that the first access network device determines to send MBS data to the UE. After receiving the request for joining the MBS from the UE, the first access network device establishes, for the UE, and allocates, to the UE, corresponding resources for subsequent MBS transmission, for example, the first PDU session used for MBS transmission. When the UE joins the MBS session, the state of the MBS session may be activated or deactivated. Therefore, the core network may notify the first access network device of the state of the MBS session by using the first PDU session modification message or establishment message.

After receiving the third message, the first access network device may obtain the state of the MBS session, to determine an MBS transmission operation. Further, the first access network device may store MBS state information in an MBS context and/or a UE context.

It should be noted that, S701 and S702 are also applicable to a non-handover scenario.

S703: The first access network device determines, based on a measurement report sent by the UE, to hand over the UE to a cell served by the second access network device. For descriptions, refer to the handover procedure shown in FIG. 2, and details are not described herein again.

S704: The first access network device sends a first message. Correspondingly, the second access network device receives the first message. The first message indicates whether the first state of the MBS session is activated or deactivated.

S705: The second access network device sends a first acknowledgment message. Correspondingly, the first access network device receives the first acknowledgment message. The first acknowledgment message is an acknowledgment message corresponding to the first message.

Optionally, the first message is a handover request message, and the first acknowledgment message is a handover request acknowledgment message.

S706: The core network device determines a second state of the MBS session. The second state is a state of the MBS session after the UE is handed over. For details, refer to the foregoing embodiments.

In a first possible implementation, this embodiment includes steps S707 and S708.

S707: The second access network device sends a second message. Correspondingly, the core network device receives the second message.

S708: The core network device sends a second acknowledgment message. Correspondingly, the second access network device receives the second acknowledgment message. The second acknowledgment message is an acknowledgment message corresponding to the second message.

The second message indicates the first state of the MBS session; and/or the second acknowledgment message indicates the second state of the MBS session. Optionally, the second message is a path switch request message, and the second acknowledgment message is a path switch request acknowledgment message.

For descriptions of S707 and S708, refer to Embodiment 2. Details are not described herein again.

In a second possible implementation, this embodiment includes steps S709 and S710.

S709: The second access network device sends a fourth message. Correspondingly, the core network device receives the fourth message. The fourth message requests to establish a user plane tunnel corresponding to the MBS session.

S710: The core network device sends a fourth acknowledgment message. Correspondingly, the second access network device receives the fourth acknowledgment message. The fourth acknowledgment message is an acknowledgment message corresponding to the fourth message. The fourth acknowledgment message indicates whether the second state of the MBS session is activated or deactivated.

For descriptions of S709 and S710, refer to Embodiment 3. Details are not described herein again.

In a third possible implementation, this embodiment includes steps S707, S708, S709, and S710. For descriptions of these steps, refer to Embodiment 4, and details are not described herein again.

In the handover process, the state of the MBS session may be unknown, and behaviors of the second access network device and the core network device may be unknown. Some embodiments provide a complete procedure of MBS session state interaction and establishment of the UP tunnel. According to some method embodiments, the behaviors of the second access network device and the core network device are determined. If the state of the MBS session is activated, the UP tunnel may be newly established between the second access network device and the core network device, to ensure a normal transmission of the MBS in the handover process. Alternatively, if the state of the MBS session is deactivated, the second access network device may not be triggered to newly establish a UP tunnel or may request to newly establish and suspend a UP tunnel, to avoid a wasting resources. In addition, the second access network device and the core network device exchange the state of the MBS session for a plurality of times, and determine whether to establish the UP tunnel. This resolves a problem of behavior mismatch caused by the change of the state of the MBS session in the handover process.

Figure 8:
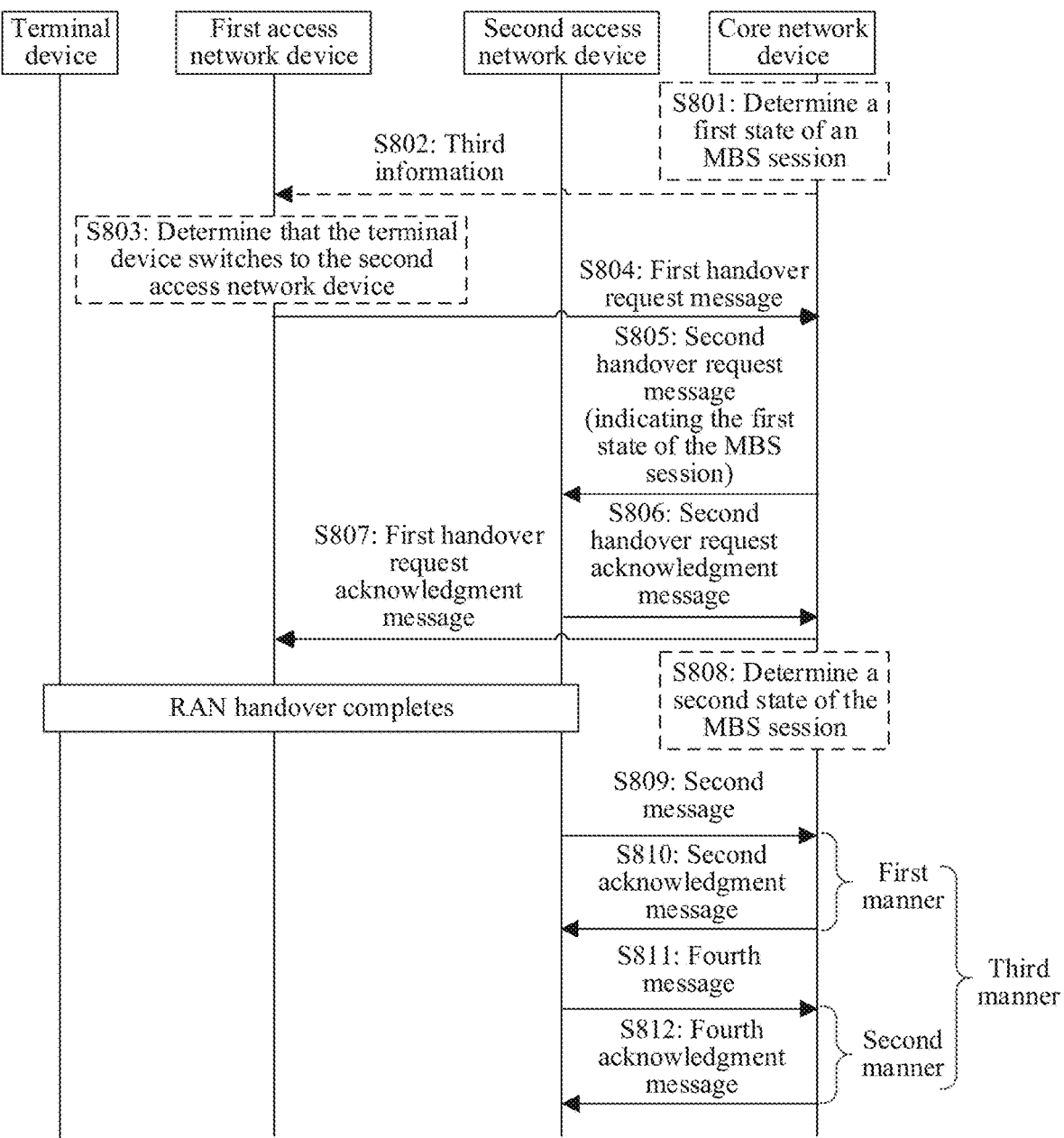
FIG. 8 is a flowchart of another communication method according to embodiments of this application.

Based on the solutions in Embodiment 1, Embodiment 2, Embodiment 3, and/or Embodiment 4, FIG. 8 is a schematic flowchart of a detailed communication method according to Embodiment 6 of this application. As shown in FIG. 8, a communication system provided in Embodiment 6 includes a first access network device, a second access network device, and a core network device. The first access network device may be configured to perform the method in any possible implementation of this embodiment, the second access network device may be configured to perform the method in any possible implementation of this embodiment, and the core network device may be configured to perform the method in any possible implementation of this embodiment. Steps represented by dashed lines in FIG. 8 are optional, and details are not described in the following. In Embodiment 6, a possible implementation is described by using the scenario 1 shown in FIG. 3A as an example. It should be noted that, for Embodiment 6, refer to the descriptions of Embodiment 1, Embodiment 2, Embodiment 3, and Embodiment 4, and same parts are not described again. In comparison with Embodiment 5, in this embodiment, an access network device serving UE needs to be switched from the first access network device to the second access network device through the core network. The method includes the following steps.

S801: The core network device determines a first state of an MBS session.

S802: The core network device sends third information. Correspondingly, the first access network device receives the third information. The third information indicates the first state of the MBS session.

S803: The first access network device determines, based on a measurement report sent by the UE, to hand over the UE to a cell served by the second access network device.

For descriptions of S801, S802, and S803, refer to Embodiment 5. Details are not described herein again.

S804: The first access network device sends a first handover request message. Correspondingly, the core network device receives the first handover request message. The first handover request message indicates to hand over the UE to a cell served by the second access network device.

S805: The core network device sends a second handover request message. Correspondingly, the second access network device receives the second handover request message. The second handover request message indicates to hand over the UE to a cell served by the second access network device. The second handover request message further indicates whether the first state of the MBS session is activated or deactivated.

The first handover request message and the second handover request message are different messages, but both indicate to hand over the UE to the cell served by the second access network device. The second handover request message indicates the first state of the MBS session. For details, refer to the method 1, the method 2, or the method 3 in which the first message indicates the first state of the MBS session in Embodiment 1, and details are not described herein again.

S806: The second access network device sends a second handover request acknowledgment message. Correspondingly, the core network device receives the second handover request acknowledgment message. The second handover request acknowledgment message is an acknowledgment message of the second handover request message.

S807: The core network device sends a first handover request acknowledgment message. Correspondingly, the first access network device receives the first handover request acknowledgment message. The first handover request acknowledgment message is an acknowledgment message of the first handover request message.

S808: The core network device determines a second state of the MBS session. For descriptions, refer to Embodiment 5. Details are not described herein again.

In a first possible implementation, this embodiment includes steps S809 and S810.

S809: The second access network device sends a second message. Correspondingly, the core network device receives the second message.

S810: The core network device sends a second acknowledgment message. Correspondingly, the second access network device receives the second acknowledgment message. The second acknowledgment message is an acknowledgment message of the second message.

The second message indicates the first state of the MBS session and/or the second acknowledgment message indicates the second state of the MBS session. Optionally, the second message is a path switch request message, and the second acknowledgment message is a path switch request acknowledgment message.

For descriptions of S809 and S810, refer to Embodiment 2. Details are not described herein again.

In a second possible implementation, this embodiment includes steps S811 and S812.

S811: The second access network device sends a fourth message. Correspondingly, the core network device receives the fourth message. The fourth message requests to establish a user plane tunnel corresponding to the MBS session.

S812: The core network device sends a fourth acknowledgment message. Correspondingly, the second access network device receives the fourth acknowledgment message. The fourth acknowledgment message is an acknowledgment message of the fourth message. The fourth acknowledgment message indicates whether the second state of the MBS session is activated or deactivated.

For descriptions of S811 and S812, refer to Embodiment 3. Details are not described herein again.

In a third possible implementation, this embodiment includes steps S809, S810, S811, and S812. For descriptions, refer to Embodiment 4, and details are not described herein again.

In the handover process, the state of the MBS session may be unknown, and behaviors of the second access network device and the core network device may be unknown. This embodiment provides a complete procedure of MBS session state interaction and establishment of the UP tunnel. According to the method in this embodiment, the behaviors of the second access network device and the core network device are determined. If the state of the MBS session is activated, the UP tunnel may be newly established between the second access network device and the core network device, to ensure a normal transmission of the MBS in the handover process. Alternatively, if the state of the MBS session is deactivated, the second access network device may not be triggered to newly establish a UP tunnel or may request to newly establish and suspend a UP tunnel, to avoid a wasting resources. In addition, the second access network device and the core network device exchange the state of the MBS session for a plurality of times, and determine whether to establish the UP tunnel. This resolves a problem of behavior mismatch caused by the change of the state of the MBS session in the handover process.

Figure 9:
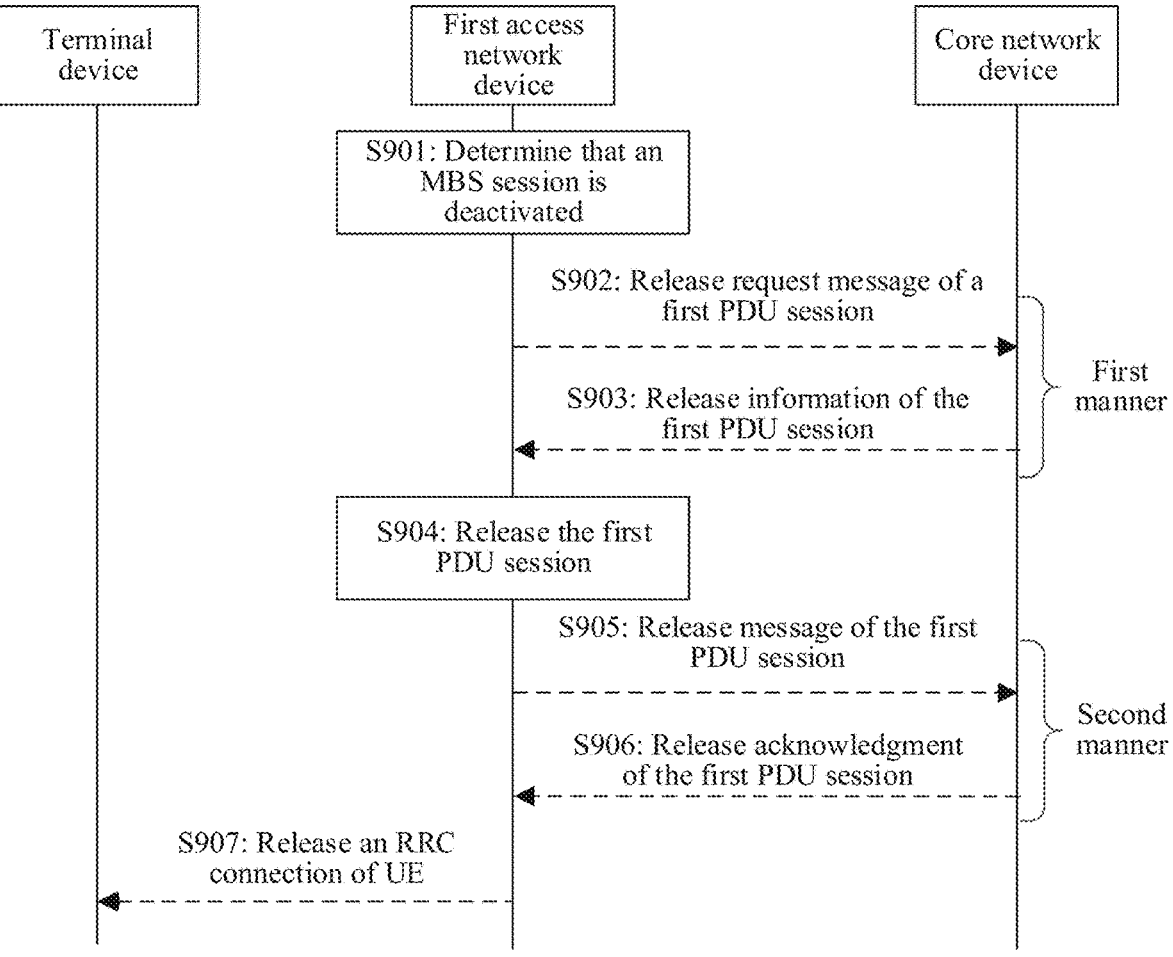
FIG. 9 is a flowchart of another communication method according to embodiments of this application.

FIG. 9 is a schematic flowchart of a communication method according to Embodiment 7 of this application. As shown in FIG. 9, a communication system provided in this embodiment includes a first access network device and a core network device. The first access network device may be configured to perform the method in any possible implementation of this embodiment, and the core network device may be configured to perform the method in any possible implementation of this embodiment. Steps represented by dashed lines in FIG. 9 are optional, and details are not described in the following. In Embodiment 7, a possible implementation is described by using the scenario 2 shown in FIG. 3B as an example. The method includes the following steps.

S901: The first access network device determines that a state of an MBS session is deactivated, and the MBS session is associated with a first PDU session. The first PDU session is used only for the MBS session.

The first PDU session is a PDU session configured for a terminal device, and the first PDU session is used only for the MBS.

Even if the MBS session is deactivated, an MBS ID and a QoS flow still exist in the first PDU session.

Optionally, before S901, the method may further include S701, S702, and S703 in Embodiment 5.

In a first possible implementation, the core network notifies the first access network device to delete the first PDU session. Therefore, this embodiment includes steps S902 and S903. Optionally, after releasing the first PDU session, the first access network device replies to the core network device. That is, S905 is further included.

S902: The first access network device sends a fifth message to the core network device. Correspondingly, the core network device receives the fifth message. The fifth message requests to release the first PDU session, or in other words, the fifth message includes a release request message of the first PDU session.

Optionally, the fifth message further includes a release cause (e.g., cause value). For example, because UE needs to switch to a non-MBS base station, information related to the MBS needs to be released.

S903: The core network device sends a fifth acknowledgment message corresponding to the fifth message. Correspondingly, the first access network device receives the fifth acknowledgment message of the fifth message sent by the core network device. The fifth acknowledgment message includes release information of the first PDU session.

Before S903 or at the same time of S903, the method further includes that the core network device releases the first PDU session, for example, resources occupied by the first PDU session.

S904: The first access network device releases the first PDU session, for example, the resources occupied by the first PDU session.

In a second possible implementation, the first access network device deletes the first PDU session, and notifies the core network device. Therefore, this embodiment includes step S905. Optionally, the core network device replies with acknowledgment information. That is, S906 is further included.

S905: The first access network device sends a release message of the first PDU session. Correspondingly, the core network device receives the release message of the first PDU session.

S906: The core network device sends a release acknowledgment message of the first PDU session. Correspondingly, the first access network device receives the release acknowledgment message of the first PDU session.

S907: The first access network device releases an RRC connection of the UE. Correspondingly, the UE receives an RRC release message.

The UE does not have a PDU session and cannot perform a handover procedure (HO). Therefore, the UE may enter an RRC idle state/inactive state. In this case, there are two optional methods. A first method is step S907, which includes indicating the UE to enter the RRC idle state/inactive state. In a second method, the UE automatically enters the RRC idle state/inactive state. The RRC idle state/inactive state may be determined based on configuration information received by the UE, for example, cell-level configuration information, or non-access stratum (NAS) information that is related to a release of a PDU session and that is received by the UE. After the UE enters the RRC idle state/inactive state, the UE may perform cell selection or reselection to meet mobility requirements.

Before the HO of the UE, an MBS session of an MBS service that the UE is interested in is deactivated. However, an MBS ID and a QoS flow still exist in the PDU session of the UE. Therefore, after the HO, the second access network device establishes a UP tunnel and a corresponding data radio bearer (DRB) for the MBS ID that the UE is interested in. If the current state of the MBS session is deactivated, and the PDU session associated with the MBS session only includes the QoS flow of the MBS, after a period of time, the newly established UP tunnel is deleted because there is no MBS data. In other words, the newly established UP tunnel is deleted before being used. This wastes resources as the newly established UP tunnel is not utilized. The method in this embodiment can avoid resource waste caused by the deletion of a newly established UP tunnel that is not yet used.

Figure 10:
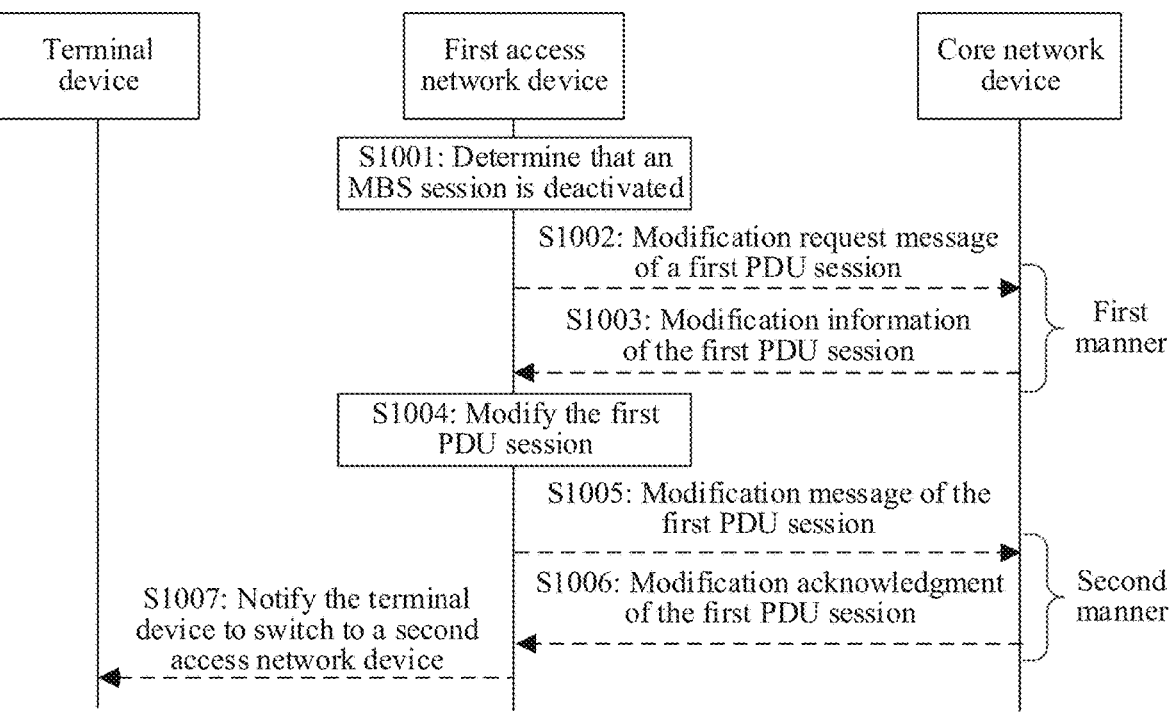
FIG. 10 is a flowchart of another communication method according to embodiments of this application.

FIG. 10 is a schematic flowchart of a communication method according to Embodiment 8 of this application. As shown in FIG. 10, a communication system provided in this embodiment includes a first access network device and a core network device. The first access network device may be configured to perform the method in any possible implementation of this embodiment, and the core network device may be configured to perform the method in any possible implementation of this embodiment. Steps represented by dashed lines in FIG. 10 are optional, and details are not described in the following. In Embodiment 8, a possible implementation is described by using the scenario 2 shown in FIG. 3B as an example. The method includes the following steps.

S1001: The first access network device determines that a state of an MBS session is deactivated, and the MBS session is associated with a first PDU session. The first PDU session is used for transmitting a unicast service, and/or the first PDU session is further associated with another activated MBS session.

The first PDU session is a PDU session configured for a terminal device, the first PDU session is used for the MBS, and the first PDU session is further used for a unicast service and/or another activated MBS session.

Optionally, before S1001, the method may further include S701, S702, and S703 in Embodiment 5.

In a first possible implementation, the core network notifies the first access network device to modify the first PDU session. Therefore, this embodiment includes steps S1002 and S1003. Optionally, after modifying the first PDU session, the first access network device replies to the core network device. That is, S1005 is further included.

S1002: The first access network device sends a fifth message to the core network device, where the fifth message requests to delete information about the MBS session from the first PDU session, or in other words, the fifth message includes a modification request message of the first PDU session, and the modification request message requests to delete the information about the MBS session.

Optionally, the fifth message further includes a modification cause (e.g., cause value). For example, because UE needs to switch to a non-MBS base station, the information related to the MBS needs to be released.

S1003: The first access network device receives a fifth acknowledgment message that corresponds to the fifth message and that is sent by the core network device, where the fifth acknowledgment message includes the modification information of the first PDU session. Before S1003 or at the same time of S903, the method further includes that the core network device modifies the first PDU session.

S1004: The first access network device deletes the information about the MBS session included in the first PDU session.

In a second possible implementation, the first access network device modifies the first PDU session, and notifies the core network device. Therefore, this embodiment includes step S1005. Optionally, the core network device replies with acknowledgment information. That is, S1006 is further included.

S1005: The first access network device sends a modification message of the first PDU session. Correspondingly, the core network device receives the modification message of the first PDU session.

S1006: The core network device sends a modification acknowledgment message of the first PDU session. Correspondingly, the first access network device receives the modification acknowledgment message of the first PDU session.

S1007: The first access network device sends handover indication information to the terminal device, where the handover indication information indicates the terminal device to switch to a target cell. In other words, the first access network device notifies the UE to switch to a cell served by the second access network device, where the second access network device does not support the MBS session. Correspondingly, the terminal device receives the handover indication information.

If the current state of the MBS session is deactivated, and a PDU session associated with the MBS session includes a QoS flow of the MBS and a QoS flow of another service, a redundant message, for example, QoS flow information associated with the MBS session, is introduced in the process of establishing a UP tunnel. This wastes signaling resources as the newly established UP tunnel is not utilized. The method in this embodiment can avoid wasting resources caused by the deletion of a newly established UP tunnel that is not yet used.

It should be noted that, in various embodiments of this application, the first/second/third/fourth/fifth acknowledgment message may alternatively be referred to as a first/second/third/fourth/fifth response message or a first/second/third/fourth/fifth feedback message, namely, a response message or a feedback message of the first/second/third/fourth/fifth message. In embodiments of this application, a name of the first/second/third/fourth/fifth acknowledgment message is not limited. In addition, in embodiments of the present disclosure, "release" may also be referred to as "delete".

It should be noted that, sequence numbers of the foregoing processes do not imply execution sequences for the various embodiments of this application. The execution sequences of the processes should be determined based on functions and internal logic of the processes. Numbers or sequence numbers in the foregoing processes are merely for differentiation for ease of description, and should not constitute any limitation on an implementation process of embodiments of this application. For example, if the first message is a handover request message, and the first acknowledgment message is a handover request acknowledgment message, S704 and S705 are performed before the RAN handover is completed. Alternatively, if the first message is not a handover request message, and the first acknowledgment message is not a handover request acknowledgment message, S704 and S705 may be performed before, during, or after the RAN handover is completed.

Figure 11:
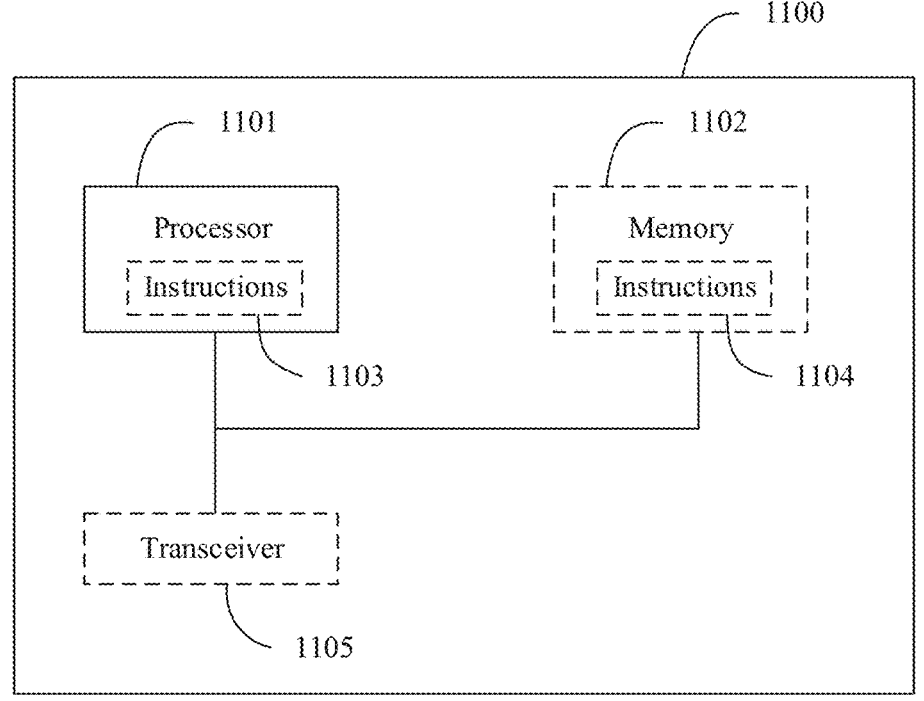
FIG. 11 is a schematic diagram of a structure of a communication apparatus according to embodiments of this application.

FIG. 11 is a schematic diagram of a structure of a communication apparatus according to an embodiment of this application. It should be noted that, parts represented by dashed boxes in FIG. 11 are optional, and details are not described in the following.

A communication apparatus 1100 includes one or more processors 1101. The processor 1101 may be configured to perform internal processing of the apparatus, to implement control and processing functions. Optionally, the processor 1101 includes instructions 1103. Optionally, the processor 1101 may store data. The processor 1101 may be a general-purpose processor, a dedicated processor, or the like. For example, the processor 1101 includes at least one of the following: a baseband processor, a central processing unit, an application processor, a modem processor, a graphics processing unit, an image signal processor, a digital signal processor, a video codec processor, a controller, and/or a neural-network processing unit. Different processors may be independent components, or may be integrated into one or more processors, for example, integrated into one or more application-specific integrated circuits.

Optionally, the communication apparatus 1100 includes one or more memories 1102, configured to store instructions 1104. Optionally, the memory 1102 may further store data. The processor and the memory may be separately disposed (e.g., wirelessly communicable), or may be integrated together.

Optionally, the communication apparatus 1100 may further include a transceiver 1105. The transceiver 1105 may be configured to send information to another apparatus or receive information from the another apparatus. The transceiver 1105 may be referred to as a transceiver, a transceiver circuit, an input/output interface, or the like.

Optionally, the communication apparatus 1100 may further include one or more of the following components: a wireless communication module, an audio module, an external memory interface, an internal memory, a universal serial bus (USB) interface, a power management module, an antenna, a loudspeaker, a microphone, an input/output module, a sensor module, a motor, a camera, a display, and/or the like. These components can be hardware, software, or a combination implementation of software and hardware.

The processor 1101 executes instructions (which may also be referred to as a computer program or code sometimes) stored in the communication apparatus 1100, that is, the instructions stored in the communication apparatus may be run on the processor 1101, so that the communication apparatus 1100 performs the method described in the foregoing embodiments. Optionally, the instructions are the instructions 1103 in the processor 1101, or the instructions are the instructions 1104 in the memory.

In an implementation, the communication apparatus 1100 may be configured to implement the method corresponding to the first access network device in the foregoing embodiments of this application. For an example function, refer to the descriptions in the foregoing embodiments. Details are not described herein again. For example, the communication apparatus 1100 includes a processor 1101, and the processor 1101 is configured to execute a computer program or instructions, so that the method corresponding to the first access network device in the foregoing embodiments of this application is performed. Optionally, the processor 1101 may communicate with another network entity through the transceiver 1105, for example, communicate with a second access network device or a core network device. Optionally, the memory 1102 is configured to store instructions and data of the first access network device.

In another implementation, the communication apparatus 1100 may be configured to implement the method corresponding to the second access network device in the foregoing embodiments of this application. For an example function, refer to the descriptions in the foregoing embodiments. Details are not described herein again. For example, the communication apparatus 1100 includes a processor

1101, and the processor 1101 is configured to execute a computer program or instructions, so that the method corresponding to the second access network device in the foregoing embodiments of this application is performed. Optionally, the processor 1101 may communicate with another network entity through the transceiver 1105, for example, communicate with a first access network device or a core network device. Optionally, the memory 1102 is configured to store instructions and data of the first access network device.

In still another implementation, the communication apparatus 1100 may be configured to implement the method corresponding to the core network device in the foregoing embodiments of this application. For an example function, refer to the descriptions in the foregoing embodiments. Details are not described herein again. For example, the communication apparatus 1100 includes a processor 1101, and the processor 1101 is configured to execute a computer program or instructions, so that the method corresponding to the core network device in the foregoing embodiments of this application is performed. Optionally, the processor 1101 may communicate with another network entity through the transceiver 1105, for example, communicate with a first access network device or a second access network device. Optionally, the memory 1102 is configured to store instructions and data of the core network device.

The processor 1101 and the transceiver 1105 described in this application may be implemented in an integrated circuit (IC), an analog IC, a radio frequency integrated circuit (RFID), a hybrid signal IC, an application-specific integrated circuit (ASIC), a printed circuit board (PCB), an electronic device, or the like. The communication apparatus that implements the communication apparatus described in this specification may be an independent device (for example, an independent integrated circuit and a mobile phone), or may be a part of a larger device (for example, a module that may be embedded in another device). For details, refer to the foregoing descriptions of the core network device and the access network device. Details are not described herein again.

Figure 12:
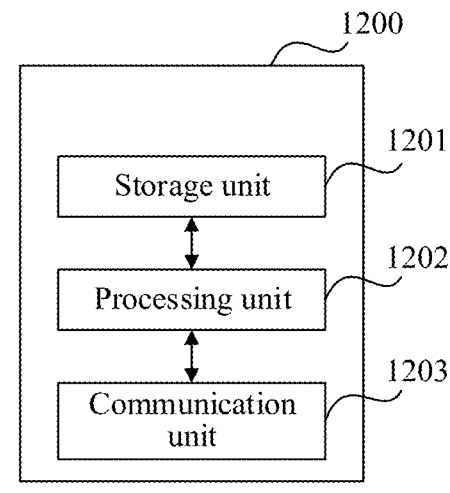
FIG. 12 is a schematic diagram of a structure of a communication apparatus according to embodiments of this application.

FIG. 12 is a schematic diagram of a structure of a communication apparatus according to an embodiment of this application. As shown in FIG. 12, an apparatus 1200 may include a processing unit 1202 and a communication unit 1203 (e.g., communication circuit). The processing unit 1202 is configured to control and manage an action of the apparatus 1200. The communication unit 1203 is configured to support communication between the apparatus 1200 and another device. Optionally, the communication unit 1203 is also referred to as a transceiver unit (e.g., transceiver circuit), and may include a receiving unit (e.g., receiving circuit) and/or a sending unit (e.g., sending circuit), which are respectively configured to perform a receiving operation and a sending operation. The apparatus 1200 may further include a storage unit 1201 (e.g., storage circuit) that is configured to store instructions and/or data of the apparatus 1200.

In an implementation, the communication apparatus 1200 may be configured to implement the method corresponding to the first access network device or the second access network device in the foregoing embodiments of this application. For an example function, refer to the descriptions in the foregoing embodiments. Details are not described herein again. The processing unit 1202 may support the apparatus 1200 in performing actions of the first access network device or the second access network device in the foregoing method examples. Alternatively, the processing unit 1202 mainly performs internal actions of the first access network device or the second access network device in the method examples, and the communication unit 1203 may support communication between the apparatus 1200 and another device, for example, support communication between the apparatus 1200 and the second access network device or the core network device, or support communication between the apparatus 1200 and the first access network device or the core network device.

In another implementation, the communication apparatus 1200 may be configured to implement the method corresponding to the core network device in the foregoing embodiments of this application. For an example function, refer to the descriptions in the foregoing embodiments. Details are not described herein again. The processing unit 1202 may support the apparatus 1200 in performing actions of the core network device in the foregoing method examples. Alternatively, the processing unit 1202 performs internal actions of the core network device in the method examples, and the communication unit 1203 may support communication between the apparatus 1200 and another device, for example, support communication between the apparatus 1200 and the first access network device or the second access network device.

Figure 13:
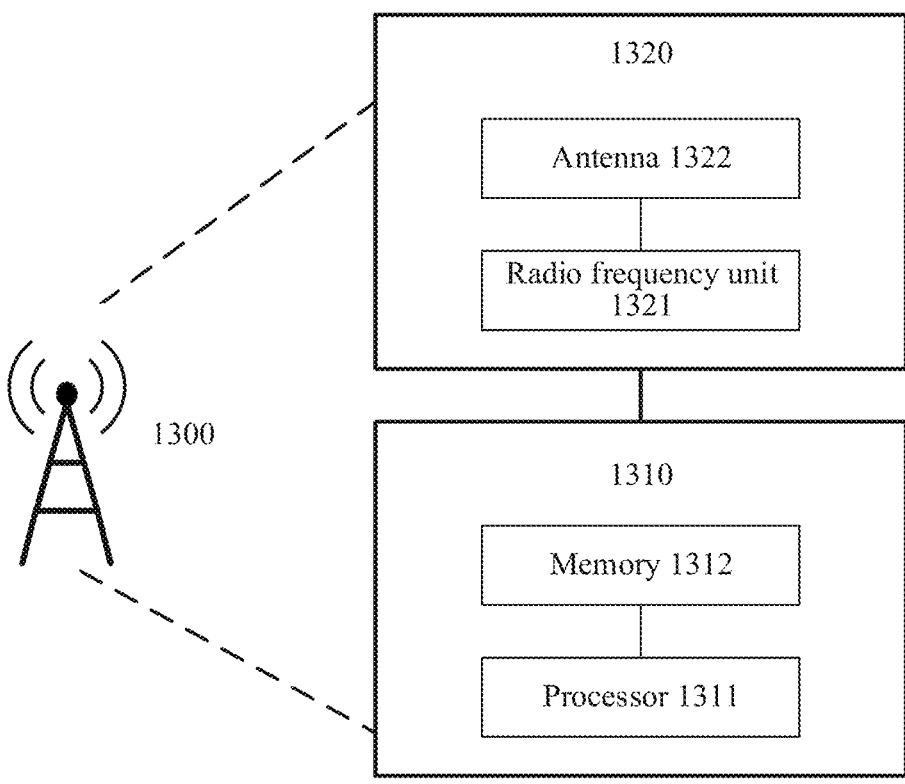
FIG. 13 is a schematic diagram of a structure of an access network device according to embodiments of this application.

FIG. 13 is a schematic diagram of a simplified structure of an access network device according to an embodiment of this application, for example, may be a schematic diagram of a simplified structure of a base station. An access network device 1300 may be applied to the first access network device or the second access network device in the foregoing embodiments, to perform operations or functions of the first access network device or the second access network device in the foregoing method embodiments. For details, refer to the descriptions in the foregoing method embodiments. Details are not described herein again.

The access network device 1300 includes a processor 1311, a memory 1312, a radio frequency unit 1321 (e.g., radio frequency circuit), and an antenna 1322. The processor 1311 is also referred to as a processing unit, and is configured to support performing the functions of the first access network device or the second access network device in the foregoing method embodiments. The processor 1311 may be one or more processors. The one or more processors may support radio access technologies of a same standard, or may support radio access technologies of different standards (for example, LTE and NR). In an implementation, the processor 1311 is an integrated circuit, for example, one or more ASICs, one or more DSPs, one or more field programmable gate arrays (FPGAs), or a combination of these types of integrated circuits. These integrated circuits may be integrated together to form a chip. The memory 1312 is also referred to as a storage unit, and is configured to store instructions (sometimes may also be referred to as a computer program or code) and/or data. The memory 1312 may be one memory, or may be a general term of a plurality of memories or storage elements. The memory 1312 and the processor 1311 may be located in a same chip or different chips. The radio frequency unit 1321 may be one or more radio frequency units. The antenna 1322 is configured to receive and send a radio frequency signal in an electromagnetic wave form, for example, configured to send a signal to or receive a signal from a terminal device for the access network device 1300. In addition, the access network device 1300 further includes a communication unit (e.g., communication circuit). The communication unit is configured to support communication between the access network device 1300 and another device. For example, when the access network device 1300 is configured to implement the method corresponding to the first access network device in the foregoing embodiments of this application, the communication unit is configured to support the access network device 1300 in communicating with a second access network device or a core network device. For example, when the access network device 1300 is configured to implement the method corresponding to the second access network device in the foregoing embodiments of this application, the communication unit is configured to support the access network device 1300 in communicating with a first access network device or a core network device. Optionally, the communication unit may include a receiving unit and/or a sending unit, respectively configured to perform a receiving operation and a sending operation.

Optionally, a baseband unit (BBU) 1310 includes the processor 1311 and the memory 1312, and is configured to perform baseband processing on a signal, manage radio resources, provide transmission management and an interface, provide a clock signal, and the like. Optionally, the BBU 2100 may include one or more boards, and a plurality of boards may jointly support a radio access network (for example, an LTE network) of a single access standard, or may separately support radio access networks (for example, an LTE network, a 5G network, or another network) of different access standards. The memory 1312 and the processor 1311 may serve one or more boards. In other words, a memory and a processor may be disposed on each board. Alternatively, a plurality of boards may share a same memory and a same processor. In addition, a necessary circuit may further be disposed on each board. The BBU 1310 may be configured to perform actions that are implemented by the first access network device or the second access network device internally and that are described in the foregoing method embodiments.

Optionally, the radio frequency unit 1321 is a remote radio unit (RRU). The RRU and the BBU may be physically disposed together, or may be physically disposed separately, that is, may be a distributed base station.

Optionally, a unit 1320 may be an active antenna unit (AAU), namely, a hardware product in which a radio frequency function and an antenna are integrated. The radio frequency unit 1321 in the AAU is a radio frequency module dedicated to the AAU, and has the same functions as the RRU. Optionally, the AAU may further include a part of a baseband processing function.

Figure 14:
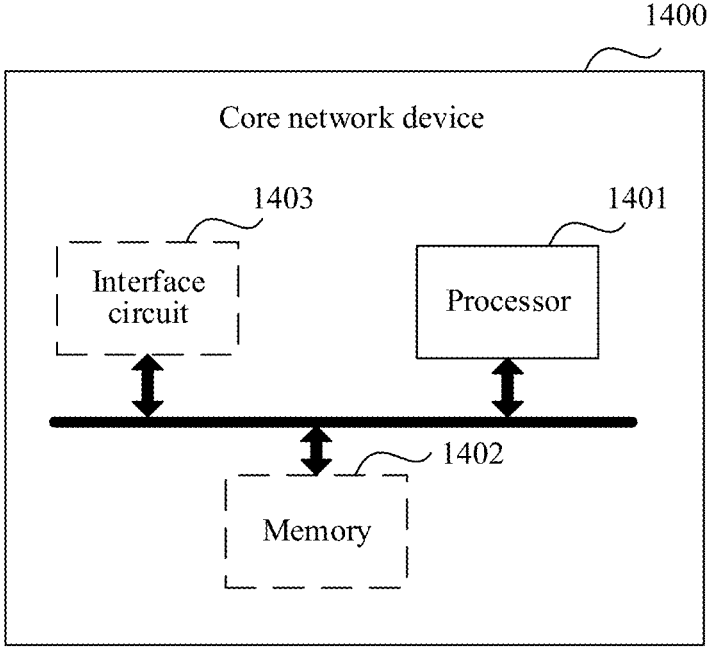
FIG. 14 is a schematic diagram of a structure of a core network device according to embodiments of this application.

FIG. 14 is a schematic diagram of a simplified structure of a core network device according to an embodiment of this application. The core network device may be a device having an AMF function, or a device having an AMF function and a UPF function. The core network device may be a device having an AMF function and an SMF function. Alternatively, the core network device may be a device having an AMF function, a UPF function, and an SMF function.

The core network device 1400 may include a processor 1401, a memory 1402, and an interface circuit 1403. The processor 1401 may be configured to process a communication protocol and communication data, and control a communication apparatus. The memory 1402 may be configured to store program and data, and the processor 1401 may perform, based on the program, the method performed by the core network device in embodiments of this application. The interface circuit 1403 may be configured for communication between the core network device 1400 and another device, where the communication may be wired communication or wireless communication, and the interface circuit may be, for example, a service-oriented communication interface.

The memory 1402 may alternatively be externally connected to the core network device 1400. In this case, the core network device 1400 may include the interface circuit 1403 and the processor 1401. The interface circuit 1403 may alternatively be externally connected to the core network device 1400. In this case, the core network device 1400 may include the memory 1402 and the processor 1401. When both the interface circuit 1403 and the memory 1402 are externally connected to the core network device 1400, the communication apparatus 1400 may include the processor 1401.

The core network device shown in FIG. 14 may implement processes related to the core network device in the foregoing embodiments. Operations and/or functions of modules in the core network device shown in FIG. 14 are respectively used to implement corresponding procedures in the foregoing method embodiments. For details, refer to the descriptions in the foregoing method embodiments. Details are not described herein again.

It may be understood that, in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily to be performed.

This application further provides a computer-readable storage medium. The computer-readable storage medium stores a computer program or instructions. When the computer program or the instructions are run, the methods performed by the first access network device, the second access network device, or the core network device in the foregoing method embodiments are implemented.

This application further provides a computer program product including a computer program or instructions. When the computer program or the instructions are run on a computer, the computer is enabled to perform the method performed by the first access network device, the second access network device, or the core network device in any one of the foregoing method embodiments.

For the foregoing computer-readable storage medium or computer program product, when the computer program or the instructions are run, the computer is enabled to perform the method performed by the first access network device in the foregoing embodiments. Alternatively, when the computer program or the instructions are run, the computer is enabled to perform the method performed by the second access network device in the foregoing embodiments. Alternatively, when the computer program or the instructions are run, the computer is enabled to perform the method performed by the core network device in the foregoing embodiments.

For example, the computer-readable storage medium or the computer program product includes instructions for receiving the first message from the first access network device and sending the first acknowledgment message to the first access network device; instructions for sending the second message to the core network device and receiving the second acknowledgment message from the core network device; and/or instructions for sending the fourth message to the core network device and receiving the fourth acknowledgment message from the core network device. For example, the computer-readable storage medium or the computer program product includes: instructions for sending the first message to the second access network device and receiving the first acknowledgment message from the second access network device; instructions for receiving the third information and storing the MBS state information in the MBS context and/or the context of the terminal device; and/or instructions for determining that the state of the MBS session is deactivated and sending the fifth message to the core network device. For example, the computer-readable storage medium or the computer program product includes: instructions for receiving the second message from the second access network device and send the second acknowledgment message to the second access network device; instructions for receiving the fourth message from the second access network device and sending the fourth acknowledgment message to the second access network device; instructions for determining the first state of the MBS session and sending the third information to the first access network device; and/or instructions for receiving the fifth message from the first access network device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, a magnetic tape, or a disk), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the method performed by the terminal device or the network device in any one of the foregoing method embodiments.

It may be clearly understood by a person skilled in the art that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, division into the units is merely logical function division and may be another division during actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve objectives of the solutions of the embodiments.

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be further understood that names of all nodes and messages in this application are merely names set for ease of description in this application, and may be different in an actual network. It should not be understood that the names of all the nodes and the messages are limited in this application. On the contrary, any name that has a function that is the same as or similar to that of the node or the message used in this application is considered as a method or an equivalent replacement in this application, and falls within the protection scope of this application. Details are not described below again.

It should be understood that, ordinal numbers such as "first" and "second" in embodiments of this application are used to distinguish between a plurality of objects, but are not intended to limit sizes, content, an order, a time sequence, priorities, importance degrees, or the like of the plurality of objects. For example, configuration information of a first signal and configuration information of a second signal may be same configuration information, or may be different configuration information. In addition, the names do not indicate that the two pieces of configuration information have different information amounts, content, priorities, importance degrees, or the like.

It should be further understood that, in this application, both "when" and "if" mean that a network element performs corresponding processing in an objective situation, but do not constitute a limitation on time, do not require that the network element has a determining action during implementation, and do not mean other limitations either.

It should be further understood that, in this application, "at least one" means one or more, and "a plurality of" means two or more. "At least one item (piece)" or a similar expression thereof means one item (piece) or a plurality of items (pieces), to be specific, any combination of these items, including any combination of singular items (pieces) or plural items (pieces). For example, at least one item (piece) of a, b, or c represents a, b, c, a and b, a and c, b and c, or a, b, and c.

It should be further understood that, unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It should be further understood that, the term "and/or" in this specification describes only an association relationship between associated objects and represents that three relationships may exist. For example, A and/or B may represent the following cases: only A exists, both A and B exist, and only B exists, where A and B may be singular or plural. The character "/" usually indicates an "or" relationship between the associated objects. For example, A/B indicates A or B.

It should be further understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method applied to a second access network device or a chip in the second access network device, the communication method comprising:

receiving a first message from a first access network device, the first message indicating whether a first state of a multicast broadcast service (MBS) session is activated or deactivated;

sending a first acknowledgment message corresponding to the first message to the first access network device;

wherein after the receiving the first message from the first access network device, the communication method further comprises:

sending a second message to a core network device, the second message requests establishing a user plane tunnel corresponding to the MBS session; and receiving a second acknowledgment message corresponding to the second message from the core network device, wherein the second acknowledgment message indicates whether a second state of the MBS session is activated or deactivated.

2. The communication method according to claim 1, wherein:

the first message comprises first state information, and the first state information indicates whether the first state is activated or deactivated; or the first message indicates whether the first state is activated or deactivated based on whether the first state information is or is not comprised within the first message.

3. The communication method according to claim 1, wherein the first message is a handover request message, and the first acknowledgment message is a handover request acknowledgment message.

4. The communication method according to claim 1, wherein the first state is a state of the MBS session before a terminal device is handed over, the second state is a state of the MBS session after the terminal device is handed over, and the MBS is an MBS that the terminal device is interested in or is receiving.

5. The communication method according to claim 1, wherein after the receiving the first message from the first access network device, the communication method further comprises:

determining that a state of the MBS session is the second state.

6. The communication method according to claim 1, wherein when the first state is activated, and the second state is deactivated, and after the receiving the second acknowledgment message that is of the second message and that is from the core network device, the communication method further comprises:

determining that the state of the MBS session is deactivated.

7. A method, comprising:

sending, by a first access network device, a first message, the first message indicating whether a first state of a multicast broadcast service (MBS) session is activated or deactivated;

receiving, by a second access network device, the first message;

sending, by the second access network device, a first acknowledgment message corresponding to the first message; and receiving, by the first access network device, the first acknowledgment message corresponding to the first message;

wherein after the receiving, by the second access network device, the first message, the method further comprises:

sending, by the second access network device, a second message, the second message requests establishing a user plane tunnel corresponding to the MBS session;

receiving, by a core network device, the second message;

sending, by the core network device, a second acknowledgment message corresponding to the second message, wherein the second acknowledgment message indicates whether a second state of the MBS session is activated or deactivated, the second state is a state of the MBS session after a terminal device is handed over; and receiving, by the second access network device, the second acknowledgment message.

8. The method according to claim 7, wherein:

the first message comprises first state information, and the first state information indicates whether the first state is activated or deactivated; or the first message indicates whether the first state is activated or deactivated based on whether first state information is or is not comprised within the first message.

9. The method according to claim 7, wherein the first message is a handover request message, and the first acknowledgment message is a handover request acknowledgment message.

10. The method according to claim 7, wherein the first state is a state of the MBS session before the terminal device is handed over, the second state is a state of the MBS session after the terminal device is handed over, and the MBS is an MBS that the terminal device is interested in or is receiving.

11. The method according to claim 7, wherein after the receiving the first message by the second access network device, the method further comprises:

determining, by the second access network device, that a state of the MBS session is the second state.

12. The method according to claim 7, wherein when the first state is activated, and the second state is deactivated, and after the receiving the second acknowledgment message by the second access network device, the method further comprises:

determining, by the second access network device, that the state of the MBS session is deactivated.

13. The method according to claim 7, before the sending, by the first access network device, the first message, the method further comprises:

receiving, by the first access network device, information from a core network device, the information indicating the first state of the MBS session, wherein:

the information is information comprised in an MBS session modification message;

the information is information comprised in a packet data unit (PDU) session modification message, or the information is information comprised in a PDU session establishment message, wherein the PDU session is associated with the MBS session; or the information is information in an information field in a packet header of a data packet of the MBS service.

14. The method according to claim 7, before the sending, by the core network device, the second acknowledgement message, the method further comprises:

determining, by the core network device, the second state of the MBS session.

15. An apparatus, comprising a processor configured to execute instructions to cause the apparatus to:

receive a first message from a first access network device, the first message indicating whether a first state of a multicast broadcast service (MBS) session is activated or deactivated;

send a first acknowledgment message corresponding to the first message to the first access network device;

wherein after the receiving the first message from the first access network device, the apparatus is further caused to:

send a second message to a core network device, the second message requests establishing a user plane tunnel corresponding to the MBS session; and receive a second acknowledgment message corresponding to the second message from the core network device, wherein the second acknowledgment message indicates whether a second state of the MBS session is activated or deactivated.

16. The apparatus according to claim 15, wherein:

the first message comprises first state information, and the first state information indicates whether the first state is activated or deactivated; or the first message indicates whether the first state is activated or deactivated based on whether the first state information is or is not comprised within the first message.

17. The apparatus according to claim 15, wherein the first message is a handover request message, and the first acknowledgment message is a handover request acknowledgment message.

18. The apparatus according to claim 15, wherein the first state is a state of the MBS session before a terminal device is handed over, the second state is a state of the MBS session after the terminal device is handed over, and the MBS is an MBS that the terminal device is interested in or is receiving.

19. The apparatus according to claim 15, wherein after the receiving the first message from the first access network device, the apparatus is further caused to:

determine that a state of the MBS session is the second state.

20. The apparatus according to claim 15, wherein when the first state is activated, and the second state is deactivated, and after the receiving the second acknowledgment message that is of the second message from the core network device, the apparatus is further caused to:

determine that the state of the MBS session is deactivated.

\* \* \* \* \*